US012498646B2

(12) United States Patent
Nishioka et al.

(10) Patent No.: US 12,498,646 B2
(45) Date of Patent: Dec. 16, 2025

(54) ELECTROPHOTOGRAPHIC CONDUCTIVE MEMBER, PROCESS CARTRIDGE, AND ELECTROPHOTOGRAPHIC IMAGE FORMING APPARATUS

(71) Applicant: CANON KABUSHIKI KAISHA, Tokyo (JP)

(72) Inventors: Satoru Nishioka, Shizuoka (JP); Atsushi Uematsu, Shizuoka (JP); Yuichi Kikuchi, Shizuoka (JP); Hiroaki Watanabe, Kanagawa (JP); Yasuhiro Fushimoto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/891,144

(22) Filed: Sep. 20, 2024

(65) Prior Publication Data

US 2025/0102945 A1 Mar. 27, 2025

(30) Foreign Application Priority Data

Sep. 27, 2023 (JP) ................................ 2023-166533
Sep. 6, 2024 (JP) ................................ 2024-153704

(51) Int. Cl.
*G03G 15/02* (2006.01)
*G03G 21/18* (2006.01)

(52) U.S. Cl.
CPC ..... *G03G 15/0233* (2013.01); *G03G 21/1814* (2013.01)

(58) Field of Classification Search
CPC .......... G03G 15/0233; G03G 21/1814; G03G 15/0818; G03G 15/1685
See application file for complete search history.

(56) References Cited

U.S. PATENT DOCUMENTS 8,440,307 B2 5/2013 Nose et al.
8,481,167 B2 7/2013 Watanabe et al.
8,491,994 B2 7/2013 Harada et al.
(Continued)

FOREIGN PATENT DOCUMENTS

JP 2020-166209 A 10/2020
JP 2021-67946 A 4/2021

OTHER PUBLICATIONS

U.S. Appl. No. 18/891,153, Atsushi Uematsu, filed Sep. 20, 2024.

*Primary Examiner* — Sandra Brase
(74) *Attorney, Agent, or Firm* — VENABLE LLP

(57) ABSTRACT

An electrophotographic conductive member comprising: a conductive layer provided on an outer surface of a support, wherein the conductive layer comprises a plurality of domains dispersed in a matrix, the plurality of domains comprise a crosslinked product of a second rubber and a conductive particle, an outer surface of the electrophotographic conductive member is configured of the matrix and an exposed portion of the domain exposed on the outer surface of the electrophotographic conductive member, an impedance is $1.0\times10^3$ to $1.0\times10^8\Omega$ of the electrophotographic conductive member, and when specific regions are a first region and a second region, a volume resistivity R1 of a portion being not the conductive particle in the first region and a volume resistivity R2 of a portion being not the conductive particle in the second region satisfy R1>R2.

14 Claims, 5 Drawing Sheets

(56) References Cited

U.S. PATENT DOCUMENTS

| | | | |
|---|---|---|---|
| 8,501,312 | B2 | 8/2013 | Watanabe et al. |
| 8,538,298 | B2 | 9/2013 | Harada et al. |
| 8,622,881 | B1 | 1/2014 | Harada et al. |
| 8,628,854 | B2 | 1/2014 | Yamauchi et al. |
| 8,668,987 | B2 | 3/2014 | Yamauchi et al. |
| 8,685,601 | B2 | 4/2014 | Nose et al. |
| 8,715,830 | B2 | 5/2014 | Yamada et al. |
| 8,750,762 | B2 | 6/2014 | Harada et al. |
| 8,771,818 | B2 | 7/2014 | Nishioka et al. |
| 8,852,743 | B2 | 10/2014 | Kikuchi et al. |
| 8,923,732 | B2 | 12/2014 | Harada et al. |
| 8,991,053 | B2 | 3/2015 | Watanabe et al. |
| 9,075,333 | B2 | 7/2015 | Uematsu et al. |
| 9,128,403 | B2 | 9/2015 | Yamauchi et al. |
| 9,146,482 | B2 | 9/2015 | Watanabe et al. |
| 9,274,442 | B2 | 3/2016 | Sato et al. |
| 9,360,789 | B1 | 6/2016 | Masu et al. |
| 9,360,833 | B2 | 6/2016 | Terada et al. |
| 9,372,429 | B2 | 6/2016 | Watanabe et al. |
| 9,411,307 | B2 | 8/2016 | Matsuda et al. |
| 9,442,408 | B2 | 9/2016 | Yamauchi et al. |
| 9,442,451 | B2 | 9/2016 | Yamauchi et al. |
| 9,448,502 | B2 | 9/2016 | Taniguchi et al. |
| 9,541,854 | B2 | 1/2017 | Kikuchi et al. |
| 9,547,250 | B2 | 1/2017 | Kikuchi et al. |
| 9,551,949 | B2 | 1/2017 | Yamauchi et al. |
| 9,581,931 | B2 | 2/2017 | Yamada et al. |
| 9,599,913 | B2 | 3/2017 | Nishioka et al. |
| 9,599,914 | B2 | 3/2017 | Uematsu et al. |
| 9,639,009 | B2 | 5/2017 | Yamaguchi et al. |
| 9,651,888 | B2 | 5/2017 | Muranaka et al. |
| 9,665,028 | B2 | 5/2017 | Arimura et al. |
| 9,740,133 | B2 | 8/2017 | Yamauchi et al. |
| 9,811,009 | B2 | 11/2017 | Yamada et al. |
| 9,897,931 | B2 | 2/2018 | Nishioka et al. |
| 9,904,199 | B2 | 2/2018 | Terada et al. |
| 9,910,379 | B2 | 3/2018 | Furukawa et al. |
| 9,958,802 | B2 | 5/2018 | Kikuchi et al. |
| 9,964,914 | B2 | 5/2018 | Arimura et al. |
| 9,977,353 | B2 | 5/2018 | Nishioka et al. |
| 10,018,927 | B2 | 7/2018 | Yamada et al. |
| 10,018,934 | B2 | 7/2018 | Yamada et al. |
| 10,025,216 | B2 | 7/2018 | Uematsu et al. |
| 10,108,129 | B2 | 10/2018 | Yamaguchi et al. |
| 10,146,149 | B2 | 12/2018 | Watanabe et al. |
| 10,248,042 | B2 | 4/2019 | Uematsu et al. |
| 10,280,148 | B2 | 5/2019 | Nishioka et al. |
| 10,317,811 | B2 | 6/2019 | Tomomizu et al. |
| 10,416,588 | B2 | 9/2019 | Masu et al. |
| 10,558,136 | B2 | 2/2020 | Furukawa et al. |
| 10,649,350 | B2 | 5/2020 | Yamaguchi et al. |
| 10,678,154 | B2 | 6/2020 | Takashima et al. |
| 10,678,158 | B2 | 6/2020 | Kikuchi et al. |
| 10,845,724 | B2 | 11/2020 | Kikuchi et al. |
| 11,112,719 | B2 | 9/2021 | Makisumi et al. |
| 11,112,748 | B2 | 9/2021 | Yamada et al. |
| 11,137,716 | B2 | 10/2021 | Hiyama et al. |
| 11,169,454 | B2 | 11/2021 | Nishioka et al. |
| 11,175,602 | B2 | 11/2021 | Nishioka et al. |
| 11,307,509 | B2 | 4/2022 | Hino et al. |
| 11,340,553 | B2 | 5/2022 | Watariguchi et al. |
| 11,347,156 | B2 | 5/2022 | Kurachi et al. |
| 11,366,402 | B2 | 6/2022 | Ishiduka et al. |
| 11,385,559 | B2 | 7/2022 | Kikuchi et al. |
| 11,392,050 | B2 | 7/2022 | Nishida et al. |
| 11,397,388 | B2 | 7/2022 | Nishioka et al. |
| 11,556,073 | B2 | 1/2023 | Fushimoto et al. |
| 11,586,121 | B2 | 2/2023 | Yamada et al. |
| 11,619,890 | B2 | 4/2023 | Uematsu et al. |
| 11,640,122 | B2 | 5/2023 | Kikuchi et al. |
| 11,644,761 | B2 | 5/2023 | Kodama et al. |
| 11,675,282 | B2 | 6/2023 | Yamaguchi et al. |
| 11,835,878 | B2 | 12/2023 | Kodama et al. |
| 11,971,683 | B2 | 4/2024 | Nishioka et al. |
| 12,032,331 | B2 | 7/2024 | Uematsu et al. |
| 2021/0116827 | A1 | 4/2021 | Fukudome et al. |
| 2021/0116829 | A1* | 4/2021 | Tomono ............. G03G 15/0233 |
| 2022/0146958 | A1* | 5/2022 | Higuchi ............. G03G 15/0233 |
| 2022/0229376 | A1 | 7/2022 | Segawa et al. |
| 2022/0229379 | A1 | 7/2022 | Kaneko et al. |
| 2022/0244658 | A1 | 8/2022 | Yamada et al. |
| 2022/0244673 | A1 | 8/2022 | Takashima et al. |
| 2023/0288826 | A1 | 9/2023 | Nakazono et al. |
| 2023/0288867 | A1 | 9/2023 | Shimozawa et al. |
| 2024/0103393 | A1 | 3/2024 | Yamakoshi et al. |

* cited by examiner

ELECTROPHOTOGRAPHIC CONDUCTIVE MEMBER, PROCESS CARTRIDGE, AND ELECTROPHOTOGRAPHIC IMAGE FORMING APPARATUS

BACKGROUND OF THE INVENTION

Field of the Invention

The present disclosure relates to an electrophotographic conductive member, a process cartridge, and an electrophotographic image forming apparatus.

Description of the Related Art

The electrophotographic image forming apparatus includes a charging member, a transfer member, and a developing member. The charging member is a member that generates discharge between the charging member and an electrophotographic photosensitive member to charge a surface of the electrophotographic photosensitive member. The developing member is a member that controls a charge of a developer coated on the surface thereof by triboelectric charging, provides a uniform charge amount distribution, and uniformly transfers the developer to the surface of the electrophotographic photosensitive member according to an applied electric field. The transfer member is a member that transfers the developer from the electrophotographic photosensitive member to a print medium such as paper or an intermediate transfer member, and at the same time, generates discharge to stabilize the transferred developer.

In an electrophotographic image forming process, the surface of the photosensitive member is charged, the charged surface of the photosensitive member is then exposed to draw a latent image, and the developer is transferred to the latent image on the surface of the photosensitive member by the developing member and transferred to a paper medium by the transfer member.

In recent years, in response to a demand for energy savings for an electrophotographic image forming apparatus, it is considered to reduce a voltage applied to a conductive member such as a charging member, a developing member, or a transfer member.

For example, the voltage (hereinafter, also referred to as a "charging bias") applied between the charging member and the photosensitive member, which is a member to be charged, is reduced, such that the voltage applied to the developing member or the transfer member is also reduced, and energy savings can be achieved in the electrophotographic image forming apparatus.

Japanese Patent Application Publication No. 2020-166209 discloses a charging member capable of suppressing occurrence of fogging on an electrophotographic image. In the above charging member, a conductive layer has a matrix-domain structure in which domains containing a crosslinked product of a second rubber and a conductive particle are dispersed in a matrix containing a crosslinked product of a first rubber.

SUMMARY OF THE INVENTION

The present inventors have attempted to set a charging bias applied between the charging member and the electrophotographic photosensitive member to a voltage (for example, −700 V to −900 V, and more specifically, −800 V) lower than a general charging bias (for example, −1,300 V) in forming an electrophotographic image using the charging member according to Japanese Patent Application Publication No. 2020-166209. As a result, in a case where the charging bias is lowered, the developer is also transferred to an unexposed portion of the surface of the photosensitive member to which the developer is not originally transferred, and as a result, a so-called "fogging" may occur on the electrophotographic image.

According to at least one aspect of the present disclosure, it is possible to set the charging bias to, for example, −700 V to −900 V. The present disclosure is directed to providing an electrophotographic conductive member capable of preventing occurrence of fogging on an electrophotographic image even when a low charging bias as described above is used. In addition, at least one aspect of the present disclosure is directed to providing a process cartridge that contributes to high-quality electrophotographic image formation. Furthermore, at least one aspect of the present disclosure is directed to providing an electrophotographic image forming apparatus capable of forming a high-quality electrophotographic image.

At least one aspect of the present disclosure provides an electrophotographic conductive member comprising:

a support having a conductive outer surface; and a conductive layer provided on the outer surface of the support, wherein the conductive layer comprises a matrix comprising a crosslinked product of a first rubber and a plurality of domains dispersed in the matrix, the plurality of domains comprise a crosslinked product of a second rubber and a conductive particle, at least parts of the plurality of domains are exposed on an outer surface of the electrophotographic conductive member, the outer surface of the electrophotographic conductive member is configured of the matrix and an exposed portion of the domain exposed on the outer surface of the electrophotographic conductive member, an impedance is $1.0\times10^3$ to $1.0\times10^8\Omega$ when an electrode is directly provided on the outer surface of the electrophotographic conductive member and an alternating current voltage having an amplitude of 1 V and a frequency of 1.0 Hz is applied between the outer surface of the support and the electrode under an environment of a temperature of 23° C. and a relative humidity of 50%, and when the domain exposed on the outer surface of the electrophotographic conductive member is a domain A, and in a cross section of the domain A in a thickness direction of the conductive layer, a maximum length of the domain A in the thickness direction of the conductive layer is Ld, a region having a thickness of 0.1×Ld on a side farthest from the support in the cross section of the domain A is a first region, and a region having a thickness of 0.1×Ld on a side closest to the support in the cross section of the domain A is a second region, a volume resistivity R1 of a portion being not the conductive particle in the first region and a volume resistivity R2 of a portion being not the conductive particle in the second region satisfy R1>R2.

At least one aspect of the present disclosure provides a process cartridge configured to be detachably attached to a main body of an electrophotographic image forming apparatus, the process cartridge comprising the electrophotographic conductive member of the present disclosure.

At least one aspect of the present disclosure provides an electrophotographic image forming apparatus comprising the electrophotographic conductive member of the present disclosure.

According to at least one aspect of the present disclosure, it is possible to obtain an electrophotographic conductive member that contributes to prevention of occurrence of fogging on an electrophotographic image when a charging bias is low. In addition, according to at least one aspect of the present disclosure, it is possible to obtain a process cartridge capable of stably forming a high-quality electrophotographic image. Furthermore, according to at least one aspect of the present disclosure, it is possible to obtain an electrophotographic image forming apparatus capable of stably forming a high-quality electrophotographic image. Further features of the present invention will become apparent from the following description of exemplary embodiments with reference to the attached drawings.

DESCRIPTION OF THE EMBODIMENTS

Figure 1:
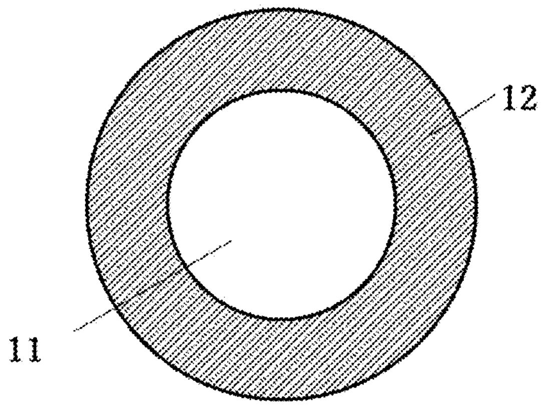
FIG. 1 is a schematic cross-sectional view of a conductive roller according to an aspect of the present disclosure.

In the present disclosure, statements of “from XX to YY” and “XX to YY” each representing a numerical value range mean numerical value ranges including lower limits and upper limits, which are endpoints, unless otherwise particularly specified. When numerical value ranges are stepwise stated, the upper and lower limits of the individual numerical value ranges can optionally be combined. In addition, in the present disclosure, such a statement as, e.g., “at least one selected from the group consisting of XX, YY, and ZZ” means any of XX, YY, ZZ, a combination of XX and YY, a combination of XX and ZZ, a combination of YY and ZZ, and a combination of XX, YY, and ZZ.

The present inventors have studied the cause of fogging on an electrophotographic image when the charging member according to Japanese Patent Application Publication No. 2020-166209 has a low charging bias.

First, a mechanism in which fogging occurs will be described. Herein, a magnitude (height) of a potential of a surface of a photosensitive member or a potential such as a charging bias refers to a magnitude (height) in a case where absolute values are compared.

In an electrophotographic image forming process, a charging bias is applied to a charging member to charge the surface of the photosensitive member, and then the charged surface of the photosensitive member is exposed to draw an electrostatic latent image. Next, a voltage (developing bias) is applied to a developing member carrying a developer. Then, the developer charged to the regular polarity (minus) is transferred to the electrostatic latent image on the surface of the photosensitive member by a potential difference between an electrostatic latent image portion on the surface of the photosensitive member and a surface of the developing member. At this time, the potential difference between the surface of the photosensitive member of an unexposed portion and the surface of the developing member is called Vback. A value of Vback is highly correlated with a value of fogging. When Vback is small, an electric field for holding the developer on the developing member becomes weak, and fogging (ground fogging) tends to increase. On the other hand, when Vback is large, the developer having the opposite polarity (plus) is transferred to the surface of the photosensitive member, and fogging (reverse fogging) tends to increase. The developer having the opposite polarity transferred to the surface of the photosensitive member by the reverse fogging is less likely to be transferred to a print medium or a surface of an intermediate transfer member, which has a lower potential than the surface of the photosensitive member of an exposed portion. Therefore, although the influence on the image is small, the amount of developer consumed may increase.

In the course of studies, the present inventors have focused on a conductive domain exposed on the outer surface of the charging member according to Japanese Patent Application Publication No. 2020-166209. In the charging member according to Japanese Patent Application Publication No. 2020-166209, it is considered that electrons are sequentially transferred between a plurality of domains from a conductive support of an elastic layer to an outer surface of the elastic layer to develop electron conductivity, and finally, discharge is generated from the domains exposed on the surface of the charging member toward the electrophotographic photosensitive member. Although a non-conductive matrix exists between the domains inside the elastic layer, fine discharge unevenness is likely to occur on the outer surface of the elastic layer because the domain having a low volume resistivity is exposed. As a result, it is presumed that fine potential unevenness occurs on the surface of the photosensitive member. When the charging bias is low, a difference in surface potential between the exposed portion and the unexposed portion of the photosensitive member becomes small, and as a result, a setting width of the developing bias also becomes narrow. Therefore, there is a tendency that the developing bias is lowered and Vback is increased in order to prioritize a reduction in ground fogging which is likely to cause image defects. It is presumed that, as a result of increasing Vback, the reverse fogging increases even in the fine surface potential unevenness of the photosensitive member as described above.

Therefore, the present inventors have recognized that it is necessary to control a volume resistivity of a portion other than the conductive particle in a thickness direction of the conductive layer in the domain exposed on the outer surface of the conductive member in order to suppress the reverse fogging when a low charging bias is applied. As a result of further studies based on such recognition, it has been found that when an electrophotographic conductive member (hereinafter, also simply referred to as a conductive member) satisfying the following requirements (A) and (B) is used as a charging member, reverse fogging can be suppressed even when a low charging bias is applied.

Requirement (A)

An impedance is $1.0\times10^{3}$ to $1.0\times10^{8}\Omega$ when an electrode is directly provided on the outer surface of the conductive member and an alternating-current voltage having an amplitude of 1 V and a frequency of 1.0 Hz is applied between the outer surface of the support and the electrode under an environment of a temperature of 23° C. and a relative humidity of 50%.

Requirement (B)

When the domain exposed on the outer surface of the electrophotographic conductive member is a domain A, and in a cross section of the domain A in a thickness direction of the conductive layer, a maximum length of the domain A in a thickness direction of the conductive layer is Ld, a region having a thickness of 0.1×Ld on a side farthest from the support in the cross section of the domain A is a first region, and a region having a thickness of 0.1×Ld on a side closest to the support in the cross section of the domain A is a second region, a volume resistivity R1 of a portion that is not the conductive particle in the first region and a volume resistivity R2 of a portion that is not the conductive particle in the second region satisfy R1>R2.

Hereinafter, each requirement will be described in detail.

Requirement (A)

The requirement (A) represents a degree of conductivity of the conductive layer. The conductive member showing such an impedance value can suppress an excessive increase in the amount of discharge current when used as a charging member. As a result, it is possible to prevent occurrence of potential unevenness of charging due to abnormal discharge. It is possible to suppress occurrence of insufficient charging due to shortage of the total amount of discharge charges.

The impedance according to the requirement (A) is preferably $1.3\times10^3$ to $9.2\times10^7\Omega$, more preferably $5.0\times10^3$ to $5.0\times10^7\Omega$, and still more preferably $1.0\times10^4$ to $1.0\times10^7\Omega$.

The impedance according to the requirement (A) can be measured by the following method.

First, in order to eliminate an influence of contact resistance between the conductive member and the measurement electrode, a low-resistance thin film is deposited on the surface of the conductive member, the thin film is used as an electrode, and the impedance is measured with two terminals using the conductive support as a ground electrode.

Examples of a method of forming the thin film include methods for forming a metal film, such as metal vapor deposition, sputtering, application of a metal paste, and attachment of a metal tape. Among them, from the viewpoint of reducing the contact resistance with the conductive member, a method of forming a metal thin film such as a platinum or palladium film as an electrode by vapor deposition is preferable.

When a metal thin film (electrode) is formed directly on the surface of the conductive member, it is preferable to provide a mechanism capable of gripping the charging member to a vacuum vapor deposition device in consideration of convenience and uniformity of the thin film. It is preferable to use a vacuum vapor deposition device further provided with a rotation mechanism for the conductive member having a columnar cross section.

For a columnar conductive member whose cross section is formed of a curved surface such as a circular shape, it may be difficult to connect the metal thin film as the above measurement electrode and an impedance measurement device. Therefore, it is preferable to use the following method. Specifically, after a metal thin film electrode having a width of about 10 mm to 20 mm is formed in a longitudinal direction of the conductive member, a metal sheet is wound without a gap, the metal sheet is connected to the measurement electrode output from the measurement device, and then, the measurement may be performed. As a result, an electrical signal from the conductive layer of the conductive member can be suitably acquired by the measurement device, and impedance measurement can be performed. When the impedance is measured, the metal sheet may be a metal sheet having an electric resistance value equivalent to that of a metal portion of a connection cable of the measurement device, and for example, an aluminum foil, a metal tape, or the like can be used.

The impedance measurement device may be any device capable of measuring an impedance in a frequency domain of up to $1.0\times10^7$ Hz, such as an impedance analyzer, a network analyzer, or a spectrum analyzer. Among them, it is preferable to measure the impedance by an impedance analyzer from the electric resistance region of the conductive member.

Figure 4A:
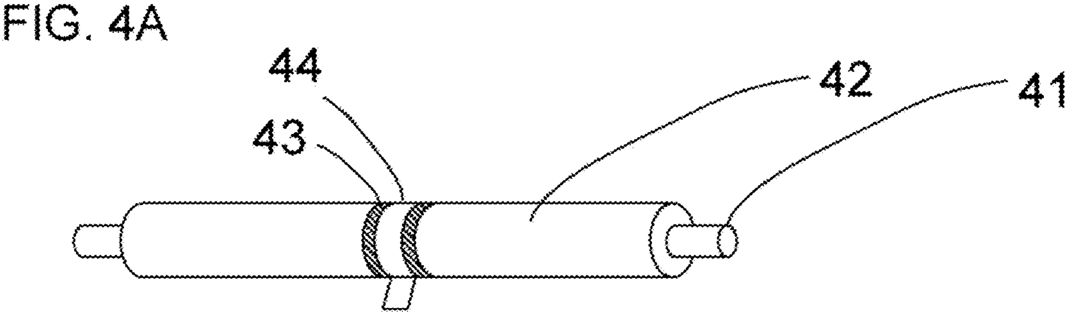
FIGS. 4A and 4B are explanatory views of impedance measurement.
Figure 4B:
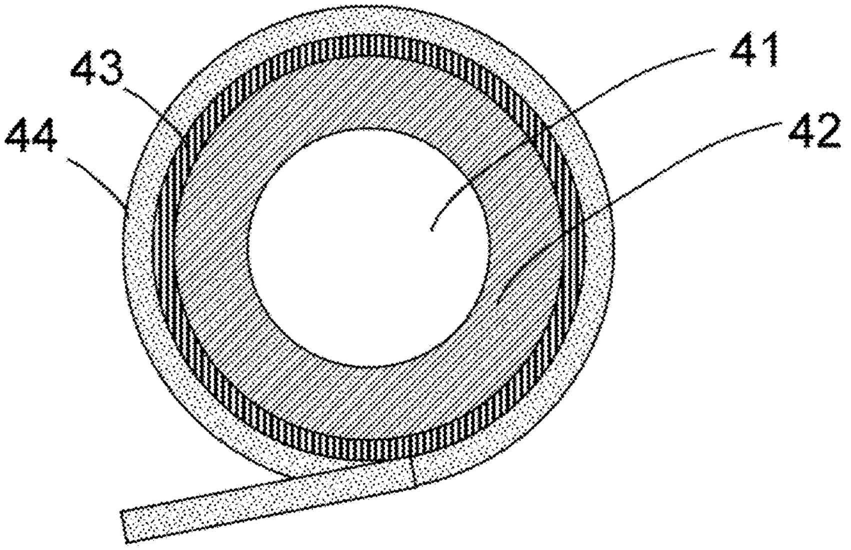

FIGS. 4A and 4B are schematic views of a state in which a measurement electrode is formed on a conductive member. In FIGS. 4A and 4B, the reference numeral 41 denotes a conductive support, the reference numeral 42 denotes a conductive layer, the reference numeral 43 denotes a platinum vapor deposition layer which is a measurement electrode, and the reference numeral 44 denotes an aluminum sheet. FIG. 4A is a perspective view, and FIG. 4B is a cross-sectional view. As shown in FIG. 4B, it is important that the conductive layer 42 is sandwiched between the conductive support 41 and the conductor layer 43 of the measurement electrode.

The impedance measurement conditions will be described. An impedance in a frequency domain of 1.0 Hz is measured using an impedance measurement device (for example, trade name "Solartron 1260", 96 W type dielectric impedance measurement system, manufactured by Solartron Metrology). The measurement is performed under an environment of a temperature of 23° C. and a relative humidity of 50%. An amplitude of an alternating current voltage is 1 Vpp. The conductive member is divided into five regions in the longitudinal direction into five equal parts, and the above measurement is performed at one arbitrary point in each region, that is, at five points in total. An arithmetic average value thereof is taken as the impedance of the conductive member. A more specific procedure of the measurement will be described below.

Requirement (B)

The requirement (B) is a requirement representing a relationship of the volume resistivity of the domain exposed on the outer surface of the conductive member in the thickness direction of the conductive layer.

Figure 5:
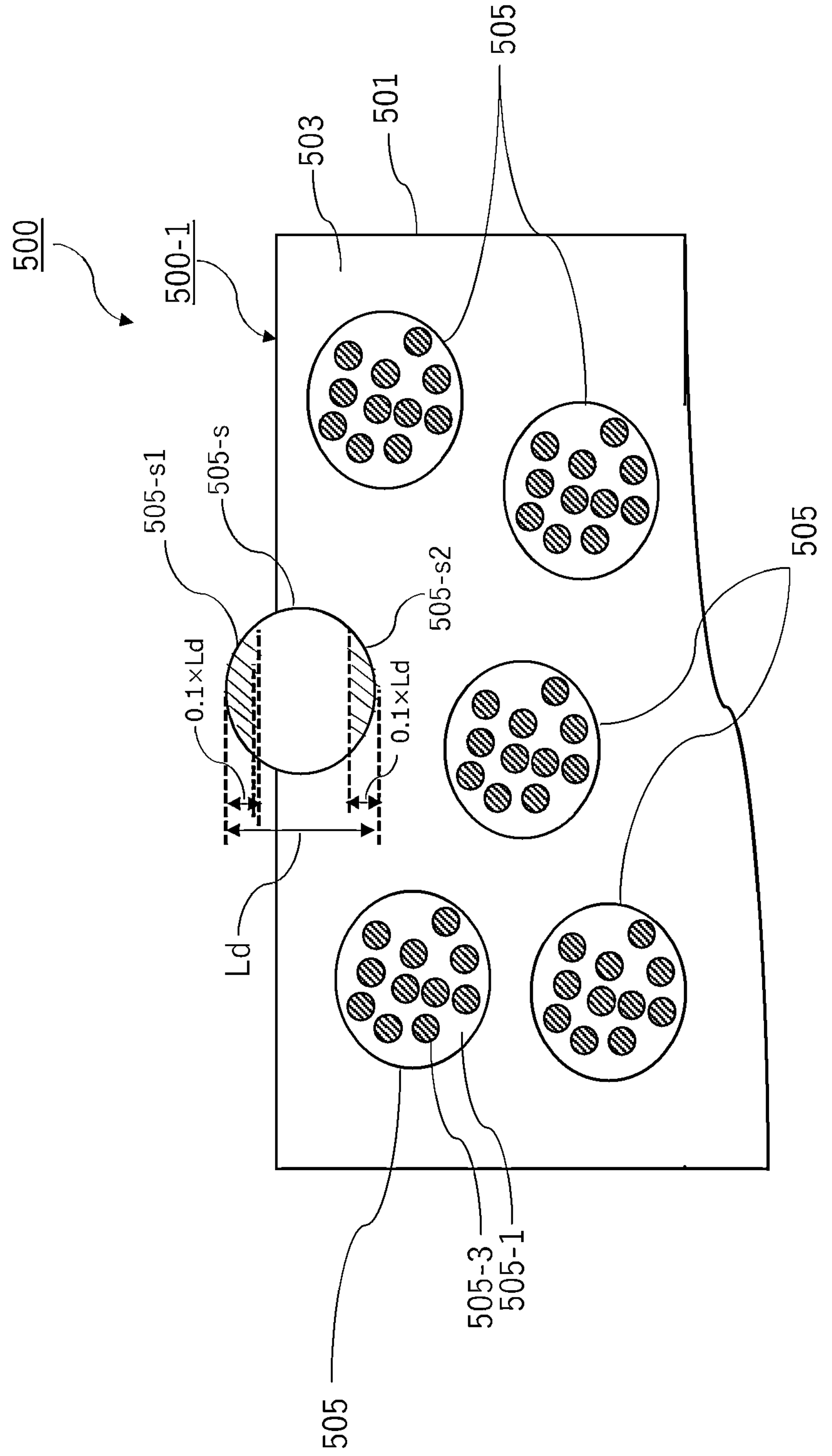
FIG. 5 is an enlarged cross-sectional view of the vicinity of a surface of a conductive layer of the conductive roller according to an aspect of the present disclosure.

FIG. 5 is a schematic cross-sectional view of the vicinity of an outer surface of a conductive layer (surface layer) of an electrophotographic conductive member (hereinafter, also referred to as an electrophotographic roller) 500 having a roller shape according to an aspect of the present disclosure.

A conductive layer 501 of the electrophotographic roller 500 comprises a matrix 503 and a plurality of domains 505 dispersed in the matrix 503. The domain 505 comprises a crosslinked product 505-1 of a second rubber and a conductive particle 505-3. Although the support is not illustrated in FIG. 5, the support exists vertically below the conductive layer 501.

At least parts of domains 505-*s* among the plurality of domains 505 are exposed on an outer surface 500-1 of the electrophotographic roller 500. That is, the outer surface 500-1 of the electrophotographic roller 500 is configured of the matrix 503 and an exposed portion of the domain 505-*s*. The domain 505-*s* also comprises the crosslinked product of the second rubber and the conductive particle, but is omitted for convenience of description of the configuration of the domain 505-*s*.

Figure 6:
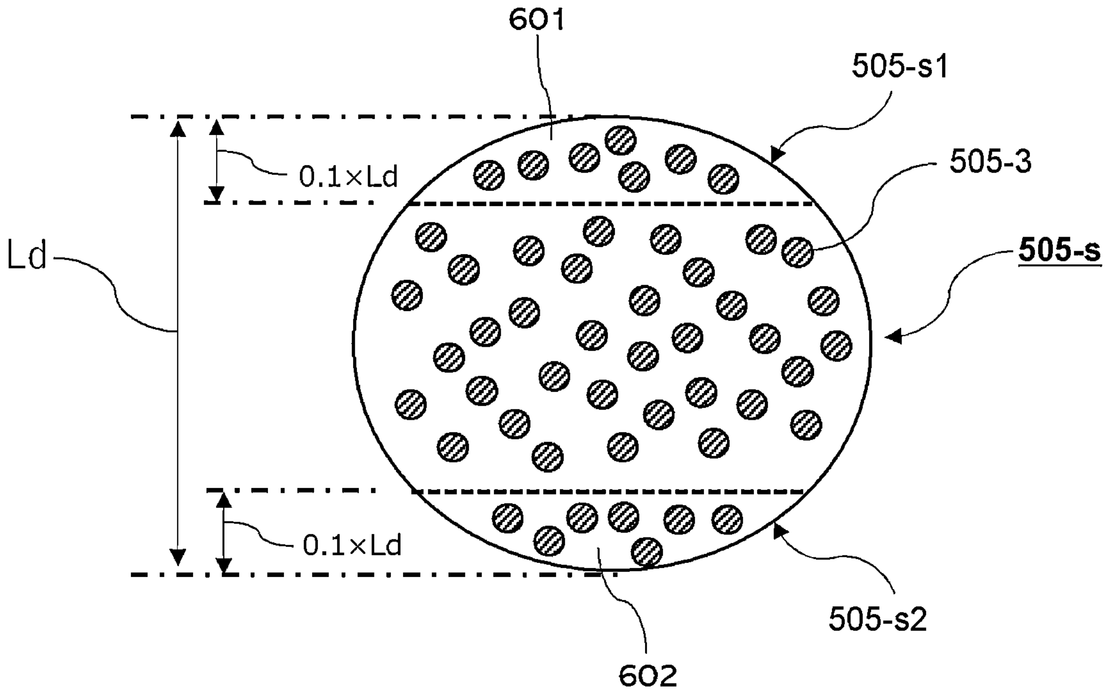
FIG. 6 is an explanatory view of domains at least partially exposed on an outer surface of the conductive layer of the conductive roller according to an aspect of the present disclosure.

When a maximum length of the domain 505-*s* in the cross section of the conductive layer 501 in the thickness direction is Ld, a region having a thickness of 0.1×Ld on a side farthest from the support is a first region 505-*s*1. A region having a thickness of 0.1×Ld on a side closest to the support is a second region 505-*s*2. As illustrated in FIG. 6, the domain 505-*s* satisfies R1>R2, where R1 is a volume resistivity of a portion 601 that is not the conductive particle in the first region 505-*s*1 and R2 is a volume resistivity of a portion 602 that is not the conductive particle in the second region.

In the conductive layer, it is considered that electron conductivity is developed by electron transfer between a plurality of domain particles 505 from the support to the outer surface of the conductive layer, and finally, discharge from the domain 505-*s* exposed on the outer surface of the conductive member toward the electrophotographic photosensitive member occurs. In this configuration, regarding the charge transfer between the plurality of domain particles 505, electrons can be efficiently transferred as the volume resistivity of the domain is lower.

On the other hand, regarding the discharge from the domain 505-*s* exposed on the surface, when the volume resistivity of the domain is large, discharge unevenness is easily suppressed, and the occurrence of fogging on the electrophotographic image is easily suppressed. That is, the volume resistivity of the domain 505-*s* exposed on the outer surface is preferably low from the viewpoint of more smoothly receiving charges from the domain 505 buried in the elastic layer, and on the other hand, the volume resistivity is preferably high for suppressing the discharge unevenness. The domain satisfying such a contradictory relationship of volume resistivity is the domain 505-*s* according to the present disclosure. In the domain 505-*s*, the volume resistivity of the portion other than the conductive particles in the domain, that is, the portion of the crosslinked product of the second rubber is high in the first region and low in the second region. Discharge unevenness from the domain 505-*s* can be suppressed by increasing the volume resistivity R1 of the portion other than the conductive particle in the first region. By increasing the volume resistivity R2 of the portion other than the conductive particle in the second region, it is possible to efficiently receive charges from the other domains 505 buried in the conductive layer.

In the requirement (B), the meaning of measuring the volume resistivity of the portion other than the conductive particle of the domain is as follows. The portion other than the conductive particle of the domain is a resin portion in which the conductive particles are dispersed. Imparting of conductivity using an electronic conductive agent such as a conductive particle is affected by the volume resistivity of the resin portion in which the electronic conductive agent is dispersed. Therefore, a degree of imparting conductivity can be evaluated by measuring a volume resistivity of the resin portion in which the conductive particles are dispersed.

In the requirement (B), the meaning of measuring the volume resistivity of each of the first region and the second region is as follows. As described above, the region involved in the discharge is the first region. It is considered that a region mainly involved in electron transfer between the domain particle phases is mainly controlled by the second region. Therefore, by measuring each of the first region and the second region and controlling the relationship between R1 and R2, it is possible to achieve both suppression of discharge unevenness and charge transfer between domain particles.

The volume resistivity R1 and the volume resistivity R2 are measured as follows. A piece (thin piece) having a predetermined thickness (for example, 1 μm), in which a matrix-domain structure is included, is cut out from the conductive layer. Examples of a method of sectioning include a sharp razor blade, a microtome, and a focused ion beam (FIB) method. In the present disclosure, a microtome is used. Next, the measurement can be performed by bringing a fine probe of a scanning probe microscope (SPM) or an atomic force microscope (AFM) into contact with a portion other than the conductive particle of the domain exposed on the outer surface in the thin piece.

When a filler or the like other than the conductive particle is also added to the domain, portions other than the conductive particle and the filler are measured. The domain will be described below in detail.

The volume resistivity is measured as follows. First, one surface of a thin piece cut out from the conductive layer is grounded. Next, a fine probe (a tip of a cantilever) of a scanning probe microscope (SPM) or an atomic force microscope (AFM) is brought into contact with a portion of a surface of the domain opposite to a ground contact surface of the thin piece, and a DC voltage of 0.5 V is applied to acquire a current value image. The volume resistivity is calculated using the above current value image and the film thickness of the thin piece.

The values of the volume resistivity R1 and the volume resistivity R2 of the columnar conductive member are determined as follows. The conductive layer is divided into five equal parts in the longitudinal direction and further divided into four equal parts in the circumferential direction, and a thin piece sample is cut out one by one from each region. From each sample, a volume resistivity r1 and a volume resistivity r2 are measured at a total of 60 locations using the above-described method for each of three locations of the domain exposed on the surface, and an arithmetic average value is calculated.

The above volume resistivity R1 and the above volume resistivity R2 are not particularly limited as long as R1>R2 is satisfied, but R1/R2≥3.0 is more preferably satisfied. When R1/R2 is 3.0 or more, discharge unevenness from the outer surface side can be suppressed while simultaneously achieving charge supply in the domain particle correlation. An upper limit thereof is not particularly limited, and for example, it is preferable that 30.0≥R1/R2≥3.0 is satisfied, and it is more preferable that 22.0≥R1/R2≥3.0 is satisfied. When R1/R2 is 30.0 or less, both acceptance of charges from other domains and discharge stability can be achieved at a higher level.

A method of adjusting the volume resistivity R1 and the volume resistivity R2 will be described below.

The conductive member will be described with reference to FIG. 1 using a conductive roller as an example. FIG. 1 is a cross-sectional view illustrating a configuration of a cross section perpendicular to a longitudinal direction which is an axial direction of the conductive roller. The conductive roller includes a columnar support 11 having a conductive outer surface, and a conductive layer 12 provided on an outer peripheral surface of the support 11, that is, an outer surface of the support. However, in the conductive member, the shape of the support is not particularly limited.

Support

A material for forming the support 11 can be appropriately selected and used from materials known in the field of electrophotographic conductive members and materials that can be used as conductive members. Examples thereof include metals or alloys such as aluminum, stainless steel, a conductive synthetic resin, iron, and a copper alloy.

Furthermore, these materials may be subjected to an oxidation treatment or a plating treatment with chromium, nickel, or the like. As the type of plating, either electroplating or electroless plating can be used. From the viewpoint of dimensional stability, electroless plating is preferable. Examples of the electroless plating used here include nickel plating, copper plating, gold plating, and various other alloy plating. Among them, electroless nickel plating is preferable.

A plating thickness is preferably 0.05 μm or more, and in consideration of a balance between work efficiency and rust prevention ability, the plating thickness is preferably from 0.10 μm to 30.00 μm.

The columnar support 11 may have a solid columnar shape or a hollow columnar shape (cylindrical shape). An outer diameter of the support is preferably from 3 mm to 10 mm. A length of the support in the longitudinal direction is not particularly limited, and is preferably, for example, from 200 mm to 300 mm.

Further, if necessary, the support may be partially processed for attachment to the electrophotographic image forming apparatus.

When an intermediate resistance layer or an insulating layer is present between the support and the conductive layer, it may be difficult to quickly supply charges after consumption of charges by discharge. Therefore, it is preferable that the conductive layer is directly provided in contact with the support. It is also a preferred aspect to provide the conductive layer on the outer surface of the support with only an intermediate layer formed of a conductive resin layer such as a primer layer interposed therebetween. The primer layer is more preferably a thin film. As a primer, a known primer can be selected and used according to the rubber material for forming the conductive layer, the material of the support, and the like. Examples of the material of the primer include a thermosetting resin and a thermoplastic resin, and specifically, known materials such as a phenol resin, a urethane resin, an acrylic resin, a polyester resin, a polyether resin, and an epoxy resin can be used. Among them, a phenol resin is preferable, and for example, Metaloc U-20 (manufactured by TOYOKAGAKU KENKYUSHO CO., LTD.) can be used.

Conductive Layer

The conductive layer comprises a matrix comprising a crosslinked product of the first rubber and a plurality of domains dispersed in the matrix. The outer surface of the conductive layer is configured of a matrix and an exposed portion of the domain exposed on the outer surface of the conductive layer. The outer surface of the conductive layer corresponds to the outer surface of the electrophotographic conductive member.

The shape of the domain is not particularly limited, and it is preferable that there are few protruded portions and depressed portions on the outer peripheral surface of the domain dispersed in the matrix. That is, the outer shape of the domain is preferably substantially spherical. When unevenness is present on the outer peripheral surface constituting the outline of the domain, density may occur in charge transfer between the domains, and electron transfer from the support of the conductive layer to the outer surface of the conductive layer may become uneven. This is because, when unevenness is present on the outer peripheral surface of the domain, the charge transfer is concentrated on the protruded portion, and a portion where the charge transfer is concentrated is partially formed, such that a portion where the charge transfer is not sufficient may be simultaneously generated. In addition, for the same reason, it is preferable that a proportion of domains having a small number of protruded portions and depressed portions on the outer peripheral surface is high.

The small number of protruded portions and depressed portions on the outer peripheral surface of the domain is specifically expressed by a value of A/B being 1.00 to 1.10, where a perimeter of the domain is A and an envelope perimeter of the domain is B. It can be said that the outer peripheral surface constituting the outline of the domain in which the value of A/B is in this range has few protruded portions and depressed portions, that is, it is a smooth outer peripheral surface. The perimeter A of the domain and the envelope perimeter B of the domain are calculated by observation with an observation device such as an electron microscope by a method described below. The value of A/B can be adjusted, for example, by reducing a domain diameter of CMB or increasing a content of the conductive particle in the domain.

In addition, the fact that the proportion of the domains having a small number of protruded portions and depressed portions on the outer surface is high is specifically expressed by the fact that, a proportion of the number of domains in which the value of A/B is 1.00 to 1.10 is 80 number % or more, where A is the perimeter of the domain and B is the envelope perimeter of the domain, the proportion being measured in the domains observed in each of all nine observation regions when 15 μm square observation regions are placed at three locations of a thickness region from the outer surface of the conductive layer to a depth of 0.1 T to 0.9 T for each of the cross sections of the conductive layer in the thickness direction at a total of three locations (that is, L1/4, L2/4, and L3/4) including the center of the conductive layer in a longitudinal direction and two locations of L/4 from both ends of the conductive layer toward the center, where L is a length of the conductive layer in the longitudinal direction and T is a thickness of the conductive layer. The proportion of the number of domains in which the value of A/B is 1.00 to 1.10 is more preferably 82 number % or more, and still more preferably 84 number % or more. An upper limit thereof is not particularly limited, and is preferably, for example, 80 to 100 number %, more preferably 82 to 100 number %, and still more preferably 84 to 100 number %.

The proportion of the number of domains in which the value of A/B is 1.00 to 1.10 can be controlled by a method to be described below.

An arithmetic average value of A is preferably 0.30 to 16 μm, and more preferably 1.2 to 9.5μ m.

Matrix

The matrix contains a crosslinked product of the first rubber.

A volume resistivity ρm of the matrix is preferably $1.0\times10^{8}$ to $1.0\times10^{17}$ Ω·cm. By setting the volume resistivity of the matrix to $1.0\times10^{8}$ Ω·cm or more, it is possible to prevent the matrix from disturbing charge transfer between the domains. By setting the volume resistivity ρm to $1.0\times10^{17}$ Ω·cm or less, it is possible to smoothly perform discharge from the conductive member to the member to be charged when a charging bias is applied between the support and the member to be charged.

The volume resistivity ρm of the matrix is more preferably $1.0\times10^{10}$ to $1.0\times10^{17}$ Ω·cm, and still more preferably $1.0\times10^{12}$ to $1.0\times10^{17}$ Ω·cm. The volume resistivity ρm of the matrix is measured as follows. A piece (thin piece) having a predetermined thickness (for example, 1 μm), in which a matrix-domain structure is included, is cut out from the conductive layer. Examples of a method of sectioning include a sharp razor blade, a microtome, and a focused ion beam (FIB) method. In the present disclosure, a microtome is used. Next, the volume resistivity can be measured by bringing a fine probe of a scanning probe microscope (SPM) or an atomic force microscope (AFM) into contact with the matrix in the thin piece.

When a filler or the like is added to the matrix, a portion other than the filler is measured.

Specifically, the volume resistivity is measured as follows. First, one surface of a thin piece cut out from the conductive layer is grounded. Next, a fine probe (a tip of a cantilever) of a scanning probe microscope (SPM) or an atomic force microscope (AFM) is brought into contact with a portion of a surface of the matrix opposite to a ground contact surface of the thin piece, and a DC voltage of 0.5 V is applied to acquire a current value image. The volume resistivity is calculated using the above current value image and the film thickness of the thin piece.

Sampling positions of the piece are three locations (that is, L1/4, L2/4, and L3/4) in total including the center of the conductive layer in the longitudinal direction and two locations of L/4 from both ends of the conductive layer toward the center, where L is the length of the conductive layer in the longitudinal direction. Next, measurement positions are three locations in the matrix portion of the thickness region from the outer surface of each piece to a depth of 0.1 T to 0.9 T, that is, nine locations in total, where T is the thickness of the conductive layer. The volume resistivity is measured at these measurement positions, and the arithmetic average value thereof is taken as the volume resistivity of the matrix.

The volume resistivity ρm of the matrix can be increased by using, as the first rubber, a non-polar rubber having a small solubility parameter value, such as natural rubber (NR), isoprene rubber (IR), or ethylene propylene diene terpolymer rubber (EPDM). The volume resistivity ρm of the matrix can be reduced by using a polar rubber having a large solubility parameter value, such as chloroprene rubber (CR) or acrylonitrile butadiene rubber (NBR).

First Rubber

The first rubber is a component having the largest blending ratio in a rubber composition for forming a conductive layer, and the first rubber dominates the mechanical strength of the conductive layer. Therefore, as the first rubber, rubber that exhibits the strength required for the electrophotographic conductive member is used for the conductive layer after crosslinking. Preferred examples of the first rubber include the following: natural rubber (NR), isoprene rubber (IR), butadiene rubber (BR), styrene-butadiene rubber (SBR), butyl rubber (IIR), ethylene-propylene rubber (EPM), ethylene propylene diene terpolymer rubber (EPDM), chloroprene rubber (CR), acrylonitrile butadiene rubber (NBR), hydrogenated NBR (H-NBR), and silicone rubber.

The first rubber is more preferably at least one selected from the group consisting of isoprene rubber (IR), butadiene rubber (BR), styrene-butadiene rubber (SBR), acrylonitrile butadiene rubber (NBR), and ethylene propylene diene rubber (EPDM), and still more preferably at least one selected from the group consisting of styrene-butadiene rubber (SBR) and acrylonitrile butadiene rubber (NBR).

The first rubber forming the matrix can contain a reinforcing material to such an extent that conductivity is not affected. Examples of the reinforcing material include reinforcing carbon black having low conductivity. Specific examples of the reinforcing carbon black include FEF, GPF, SRF, and MT carbon.

Furthermore, a filler such as calcium carbonate; a processing aid such as zinc stearate; a vulcanization aid; a vulcanization accelerator such as tetrabenzylthiuram disulfide, tetramethylthiuram monosulfide, N-cyclohexyl-2-benzothiazolylsulfenamide, or 2-mercaptobenzimidazole; a vulcanization acceleration aid such as zinc oxide; a vulcanization retarder; an antiaging agent; a softener; a dispersing agent; a colorant; a coarse particle; and the like may be added to the first rubber, if necessary.

An SP value of the first rubber is not particularly limited, and is preferably 15.0 to 23.0 and more preferably 16.0 to 22.0. Within the above range, an absolute value of a difference between the solubility parameters of the first rubber and the second rubber can be easily adjusted to a range described below.

Domain

The domain contains a crosslinked product of the second rubber and a conductive particle. Here, the conductivity in the conductive particle is a volume resistivity of less than $1.0\times10^{8}$ Ω·cm.

At least parts of the plurality of domains are exposed on the outer surface of the electrophotographic conductive member.

When the impedance and the volume resistivity ρm of the matrix according to the requirement (A) described above are satisfied, electrons are sequentially transferred between the plurality of domains from the conductive support, and finally, electrons are emitted from the domains exposed on the surface of the conductive member, such that electron conductivity is developed. Therefore, the domains are exposed on the outer surface in an amount at which the effect of the present disclosure can be obtained.

As described above, the requirements (A) and (B) are satisfied, such that the reverse fogging can be suppressed even when a low charging bias is applied.

Second Rubber

Specific examples of the second rubber preferably include at least one selected from the group consisting of natural rubber (NR), isoprene rubber (IR), butadiene rubber (BR), acrylonitrile butadiene rubber (NBR), styrene-butadiene rubber (SBR), butyl rubber (IIR), ethylene-propylene rubber (EPM), ethylene propylene diene rubber (EPDM), chloroprene rubber (CR), nitrile rubber (NBR), hydrogenated nitrile rubber (H-NBR), silicone rubber, and urethane rubber (U).

The second rubber more preferably includes at least one selected from the group consisting of isoprene rubber (IR), butadiene rubber (BR), styrene-butadiene rubber (SBR), acrylonitrile butadiene rubber (NBR), and ethylene propylene diene rubber (EPDM), and still more preferably includes at least one selected from the group consisting of styrene-butadiene rubber (SBR), acrylonitrile butadiene rubber (NBR), and ethylene propylene diene rubber (EPDM). The second rubber is preferably different from the first rubber.

An SP value of the second rubber is not particularly limited, and is preferably 15.0 to 23.0 and more preferably 16.0 to 22.0. Within the above range, an absolute value of a difference between the solubility parameters of the first rubber and the second rubber can be easily adjusted to a range described below.

Conductive Particle

Examples of the conductive particle include a particle of an electronic conductive agent, such as a particle having a conductive surface coated with a carbon material such as conductive carbon black or graphite, a conductive oxide such as titanium oxide or tin oxide, a metal such as Cu or Ag, and a conductive oxide or metal. Two or more kinds of these conductive particles may be appropriately blended and used.

In the domain observed in the cross section of the conductive layer in the thickness direction, a ratio $S_c/S$ of a cross-sectional area of the conductive particle contained in the domain to a cross-sectional area of the domain is preferably 20.0 area % or more. By filling the domain with the conductive particles at a high density in this manner, it is easy to make the unevenness of the outer peripheral surface of the domain small. An upper limit of $S_c/S$ is not particularly limited, and is preferably 35.0 area % or less. For example, $S_c/S$ is preferably 20.0 to 35.0 area %, 25.0 to 35.0 area %, or 26.0 to 33.0 area %.

In order to obtain a domain densely filled with conductive particles, it is preferable to use conductive carbon black as the conductive particle. That is, the conductive particle preferably contains carbon black. For example, the carbon black is preferably at least one selected from the group consisting of gas furnace black, oil furnace black, thermal black, lamp black, acetylene black, and ketjen black.

Among them, carbon black having a DBP absorption amount of 40 to 80 $cm^3/100$ g can be particularly preferably used. The DBP absorption amount ($cm^3/100$ g) is a volume of dibutyl phthalate (DBP) to which 100 g of carbon black can be adsorbed, and is measured in accordance with Japanese Industrial Standard (JIS) K6217-4:2017 (Carbon Black for Rubber-Basic Characteristics—Part 4: Method of Determining Oil Absorption Amount (including compressed sample)). In general, carbon black has a tufted higher order structure in which primary particles having an average particle size of from 10 nm to 50 nm are aggregated. The tufted higher order structure is called a structure, and a degree thereof is quantified by the DBP absorption amount ($cm^3/100$ g).

In general, carbon black having a developed structure has a high reinforcing property with respect to rubber, is hardly incorporated into rubber, and has a significantly high shear torque during kneading. Therefore, it is difficult to increase the filling amount in the domain.

On the other hand, the conductive carbon black having a DBP absorption amount within the above range has an undeveloped structure, and thus, the carbon black is less aggregated and has excellent dispersibility in rubber. Therefore, the filling amount in the domain can be increased, and as a result, the outer shape of the domain closer to a sphere can be easily obtained.

Further, in the carbon black in which the structure is developed, the carbon blacks are easily aggregated with each other, and the aggregate easily becomes a lump having a large uneven structure. On the other hand, the conductive carbon black having a DBP absorption amount within the above range is preferable for obtaining a domain having small unevenness on the outer peripheral surface because it is difficult to form an aggregate. A content of the conductive particle such as conductive carbon black is preferably 20 to 150 parts by mass with respect to 100 parts by mass of the second rubber contained in the domain. The content is more preferably 50 to 100 parts by mass.

A volume resistivity of the domain is preferably $1.0\times10^4$ $\Omega\cdot$cm or less. When the volume resistivity of the domain is $1.0\times10^4$ $\Omega\cdot$cm or less, conduction is easy even at a volume fraction of domains that stably form a matrix-domain structure. A lower limit of the volume resistivity of the domain is not particularly limited, and may be, for example, $1.0\times10^1$ to $1.0\times10^4$ $\Omega\cdot$cm or $5.0\times10^1$ to $1.0\times10^4$ $\Omega\cdot$cm.

The measurement of the volume resistivity of the domain is performed in the same manner as in the measurement of the volume resistivity of the above matrix except that the measurement is performed at a location corresponding to a domain of an ultra-thin piece.

Method of Producing Conductive Layer

The conductive layer of the conductive member can be formed, for example, through a method including the following steps (i) to (iv):

- Step (i): preparing a rubber composition for forming a domain (hereinafter, also referred to as "CMB") containing a conductive particle and a second rubber;
- Step (ii): preparing a rubber composition for forming a matrix (hereinafter, also referred to as "MRC") containing a first rubber;
- Step (iii): kneading CMB and MRC to prepare a rubber composition for forming a conductive layer having a matrix-domain structure; and
- Step (iv): forming a layer of the rubber composition for forming a conductive layer prepared in step (iii) directly or via another layer on a support, and curing the layer of the rubber composition to form a conductive layer.

A mixing ratio (CMB:MRC) of CMB to MRC on a mass basis in the rubber composition for forming a conductive layer is preferably 10:90 to 40:60, and more preferably 20:80 to 30:70. The rubber composition for forming a conductive layer may contain known additives such as a vulcanizing agent and a vulcanization accelerator, if necessary. The conductive layer is, for example, a crosslinked product (vulcanized product) of the rubber composition for forming a conductive layer.

Then, as the conductive particle used for preparing CMB, it is effective to prepare CMB by adding a large amount of carbon black having a DBP absorption amount of preferably 40 to 170 $cm^3/100$ g and more preferably 40 to 90 $cm^3/100$ g to the second rubber and kneading the mixture. In this case, a blending amount of the carbon black with respect to the second rubber in CMB is preferably, for example, 40 to 200 parts by mass with respect to 100 parts by mass of the second rubber. The blending amount is particularly 50 to 100 parts by mass.

The ratio $S_c/S$ of the cross-sectional area of the conductive particle contained in the domain to the cross-sectional area of the domain may be measured as follows. First, a thin piece of the conductive layer is prepared. In order to preferably observe the matrix-domain structure, a pretreatment, such as a dyeing treatment or a vapor deposition treatment, may be performed to preferably obtain a contrast between a conductive phase and an insulating phase.

The thin piece subjected to a fracture surface formation and a pretreatment can be observed with a scanning electron microscope (SEM) or a transmission electron microscope (TEM). Among them, it is preferable to perform observation with an SEM at a magnification of 1,000 to 100,000 from the viewpoint of the accuracy of quantification of the area of the domain, which is a conductive phase. The obtained observation image is binarized and analyzed using an image analysis device or the like to obtain the above ratio. A specific method will be described below.

In order to further reduce an electric field concentration between the domains, it is preferable to bring the outer shape of the domain closer to a sphere. Examples of the method include a method in which a domain diameter of CMB is controlled to be small in a step of preparing a rubber composition in which domains of CMB are formed in a matrix of MRC by kneading MRC and CMB to cause phase separation between MRC and CMB. When the domain diameter of CMB is reduced, the total specific surface area of CMB is increased, and an interface with the matrix is increased, such that tension for reducing tension acts on the interface of the domain of CMB. As a result, the outer shape of the domain of CMB is closer to a sphere.

Here, Taylor's equation (Equation (1)), Wu's empirical equation (Equations (2) and (3)), and Tokita's equation (Equation (4)) are known as factors that determine a domain diameter D in a matrix-domain structure formed when two incompatible polymers are melt-kneaded. (Sumitomo Chemical Co., Ltd., Technical Journal, 2003-II, 42)

Taylor's equation (1)

$$D = [C \cdot \sigma / \eta m \cdot \gamma] \cdot f(\eta m / \eta d)$$

Wu's empirical equation (2)

$$\gamma \cdot D \cdot \eta m / \sigma = 4(\eta d / \eta m)^{0.84} \cdot \eta d / \eta m > 1$$

$$\gamma \cdot D \cdot \eta m / \sigma = 4(\eta d / \eta m)^{-0.84} \cdot \eta d / \eta m < 1 \quad (3)$$

Tokita's equation $$D \cong \frac{12 \times P \times \sigma \times \phi}{\pi \times \eta \times \gamma}\left(1 + \frac{4 \times P \times \phi \times EDK}{\pi \times \eta \times \gamma}\right) \quad (4)$$

In Equations (1) to (4), D represents a domain diameter of CMB (maximum Feret diameter Df), C represents a constant, σ represents an interfacial tension, nm represents a viscosity of the matrix, and ηd represents a viscosity of the domain. In Equation (4), γ represents a shear rate, η represents a viscosity of a mixed system, P represents a collision-coalescence probability, φ represents a domain phase volume, and EDK represents a domain phase cutting energy.

From above Equations (1) to (4), in order to reduce the domain diameter D of CMB, for example, it is effective to control physical properties with CMB and MRC and kneading conditions in step (iii). Specifically, it is effective to control the following four items (a) to (d):

(a) a difference in interfacial tension σ between CMB and MRC;
(b) a ratio (ηm/ηd) of a viscosity (ηd) of CMB to a viscosity (ηm) of MRC;
(c) a shear rate (γ) during kneading of CMB and MRC and an energy amount (EDK) during shearing in step (iii); and
(d) a volume fraction of CMB to a kneaded product of CMB and MRC in step (iii).

(a) Difference in Interfacial Tension Between CMB and MRC

In general, when two kinds of incompatible rubbers are mixed, phase separation occurs. This is because, since the interaction between the same polymers is stronger than the interaction between the different polymers, the same polymers are aggregated with each other, and the free energy is lowered and stabilized. Since the interface of the phase separation structure is in contact with the different polymers, the free energy is higher than that of the inside stabilized by the interaction between the same molecules. As a result, in order to reduce the free energy of the interface, interfacial tension is generated to reduce the area in contact with the different polymers. In a case where the interfacial tension is small, even different polymers tend to be mixed more uniformly in order to increase entropy. The state of uniform mixing is dissolution, and the SP value as a measure of solubility and the interfacial tension tend to correlate with each other. That is, it is considered that the interfacial tension difference between CMB and MRC correlates with the SP value difference between CMB and MRC. Therefore, the interfacial tension difference can be controlled by a combination of MRC and CMB, particularly a combination of the first rubber and the second rubber.

A combination of the first rubber in MRC and the second rubber in CMB is preferably set so that the absolute value of the difference in solubility parameter (SP value) between the first rubber and the second rubber is 0.4 to 5.7 $(J/cm^3)^{0.5}$. The combination is more preferably set so that the absolute value of the difference between the SP values is 0.4 to 5.0 $(J/cm^3)^{0.5}$, still more preferably set so that the absolute value of the difference between the SP values is 0.4 to 4.7 $(J/cm^3)^{0.5}$, particularly preferably set so that the absolute value of the difference between the SP values is 0.4 to 3.2 $(J/cm^3)^{0.5}$, and most preferably set so that the absolute value of the difference between the SP values is 0.4 to 1.0 $(J/cm^3)^{0.5}$.

By using a rubber combination in which an absolute value of a difference between SP values is within the above range, a phase separation structure can be more stably formed, and the domain diameter D of CMB can be reduced.

The SP value $(J/cm^3)^{0.5}$ of the first rubber is preferably 16.0 to 22.0, and more preferably 17.0 to 21.7.

The SP value $(J/cm^3)^{0.5}$ of the second rubber is preferably 16.0 to 22.0, and more preferably 16.0 to 20.0.

Examples of a preferred combination of the first rubber and the second rubber include combinations shown in Table 1 on the premise that the absolute value of the difference between the SP values is within the above range.

TABLE 1

| First rubber | Second rubber |
|---|---|
| SBR | NBR |
| NBR | SBR |
| NBR | BR |
| EPDM | NBR |
| EPDM | SBR |
| IR | SBR |
| BR | NBR |
| SBR | EPDM |
| SBR | IR |

Method of Measuring SP Value

The SP values of the first rubber and the second rubber included in of MRC and CMB, respectively, can be accurately calculated by creating a calibration curve using a material whose SP value is known. As the known SP value, a catalog value of a material manufacturer can also be used.

For example, an SP value of each of NBR and SBR is almost determined by a content ratio of acrylonitrile or styrene without depending on the molecular weight. Therefore, in the rubber constituting the matrix and the domain, the content ratio of acrylonitrile or styrene is analyzed using an analysis method such as pyrolysis gas chromatography (Py-GC) and solid NMR. Then, an SP value can be calculated based on the content ratio from the calibration curve obtained from the material whose SP value is known.

The SP value of isoprene rubber is determined by an isomeric structure of 1,2-polyisoprene, 1,3-polyisoprene, 3,4-polyisoprene, cis-1,4-polyisoprene, trans-1,4-polyisoprene, or the like. Therefore, similarly to SBR and NBR, an isomer content ratio is analyzed by Py-GC, solid NMR, or the like, and the SP value can be calculated from a material whose SP value is known.

The SP value of the material whose SP value is known is obtained by the Hansen sphere method.

(b) Viscosity Ratio Between CMB and MRC

As a viscosity ratio (ηd/ηm) between CMB and MRC is closer to 1, the maximum Feret's diameter of the domain can be made smaller. The viscosity ratio between CMB and MRC can be adjusted by selecting a Mooney viscosity of each of CMB and MRC and blending the type and amount of the filler. It is also possible to add a plasticizer such as paraffin oil to such an extent that the formation of the phase separation structure is not hindered. The viscosity ratio can be adjusted by adjusting the temperature during kneading. The viscosity of CMB or MRC can be obtained by measuring a Mooney viscosity $ML_{(1+4)}$ at the rubber temperature during kneading according to JIS K6300-1:2013.

(c) Shear Rate During Kneading of MRC and CMB and Energy Amount During Shearing

The maximum Feret's diameter Df of the domain can be made smaller as the shear rate during kneading of MRC and CMB is higher and the amount of energy during shearing is larger.

The shear rate can be increased by increasing an inner diameter of a stirring member such as a blade or a screw of a kneader, reducing a gap from an end surface of the stirring member to an inner wall of the kneader, or increasing a rotation speed. The energy during shearing can be increased by increasing the rotation speed of the stirring member or increasing the viscosity of the first rubber in CMB and the second rubber in MRC.

(d) Volume Fraction of Domain (Volume Fraction of CMB to Kneaded Product of CMB and MRC)

The volume fraction of CMB to the kneaded product of CMB and MRC correlates with the collision-coalescence probability of CMB to MRC. Specifically, when the volume fraction of CMB to the kneaded product of CMB and MRC is reduced, the collision-coalescence probability between CMB and MRC is reduced. That is, the size of the domain can be reduced by reducing the volume fraction of the domain in the conductive layer within a range in which necessary conductivity can be obtained.

Method of Confirming Matrix-Domain (M-D) Structure

The matrix-domain structure can be confirmed, for example, by the following method. That is, a thin piece of the conductive layer is cut out from the conductive layer to prepare an observation sample. Examples of a unit for cutting the thin piece include a razor blade, a microtome, and FIB.

The observation sample is subjected to a treatment (for example, dyeing treatment and vapor deposition treatment) that can facilitate distinction between the matrix and the domain, if necessary. Then, the observation sample is observed with a laser microscope, an SEM, or a TEM. A more specific procedure will be described below.

Method of Measuring Perimeter and Envelope Perimeter of Domain, and Number and Average Number of Domains The perimeter and the envelope perimeter of the domain, and the number and average number of domains can be measured, for example, as follows.

First, a piece is prepared by a method similar to the method in the measurement of the volume resistivity of the matrix described above. Subsequently, a thin piece having a fracture surface can be formed by a method such as a lower freezing fracture method, a cross polisher method, or a focused ion beam (FIB) method. In consideration of the smoothness of the fracture surface and the pretreatment for observation, the FIB method is preferable. In order to preferably observe the matrix-domain structure, a pretreatment, such as a dyeing treatment or a vapor deposition treatment, may be performed to preferably obtain a contrast between a conductive phase and an insulating phase.

The thin piece subjected to a fracture surface formation and a pretreatment can be observed with an SEM or a TEM. Among them, it is preferable to perform observation with an SEM at a magnification of 1,000 to 100,000 from the viewpoint of the accuracy quantification of the perimeter and the envelope perimeter of the domain.

The perimeter and the envelope perimeter of the domain, and the number of domains can be measured by quantifying the captured image as described above. The fracture surface image obtained by the observation with an SEM is subjected to 8-bit gray scaling using image processing software such as trade name: Image-Pro Plus (manufactured by Planetron) to obtain a monochrome image with 256 levels of gray. Next, the black and white of the image are subjected to inversion processing so that the domain in the fracture surface becomes white, and binarization is performed. Next, the perimeter, the envelope perimeter, and the number of domains may be calculated from each of the domain groups in the image. A more specific method will be described below.

For the above measurement, a piece is cut out from the sample at three locations (that is, L1/4, L2/4, and L3/4) in total including the center of the conductive layer in the longitudinal direction and two locations of L/4 from both ends of the conductive layer toward the center, where L is the length of the conductive layer of the conductive member in the longitudinal direction. The direction in which the piece is cut out is a direction that provides a cross section perpendicular to the longitudinal direction of the conductive layer. Regarding the observation position of each piece section, measurement may be performed at a total of nine observation regions when 15 μm square observation regions are placed at three locations of the thickness region from the outer surface of each piece to a depth of 0.1 T to 0.9 T, where T is a thickness of the conductive layer. The arithmetic average value of the measured values obtained in the nine observation regions is taken as the measurement result.

Method for Achieving Requirement (B)

A method for achieving the requirement (B) is not particularly limited as long as the volume resistivity R1 and the volume resistivity R2 satisfy R1>R2. Specific examples of the method include an impregnation treatment and a method of adding a material to be surface-transferred into a material for forming a conductive layer. More specifically, an impregnation treatment capable of increasing the resistance only in the vicinity of the outer surface of the conductive layer is preferable.

The impregnation treatment is a treatment in which a monomer is impregnated from a surface of a conductive layer precursor such as a conductive resin layer, and then the monomer is cured. A resin that is a cured product of a monomer is also referred to as a curable resin.

By performing the impregnation treatment, the curable resin is present in a gap of the rubbers constituting the matrix and the domain forming the surface of the conductive layer. As a result, the distance between the conductive particles present in the domain is widened by the curable resin, increasing the resistance. In addition, since a curable resin generally has a high volume resistivity, a resin portion constituting a matrix also has a high resistance. Furthermore, since a network derived from the curable resin is formed in the rubber, ion conductivity derived from impurities contained in the rubber is also reduced. Therefore, it is considered that the volume resistivity of the rubber increases. That is, the volume resistivity R1 of the portion other than the conductive particle in the first region tends to be larger than the volume resistivity R2 of the portion other than the conductive particle in the second region.

From the above action and effect, the requirement (B) can be achieved by performing an impregnation treatment on the conductive layer having a matrix-domain structure in which domains containing a crosslinked product of the second rubber and a conductive particle are dispersed in a matrix containing a crosslinked product of the first rubber, and the domains are exposed on the surface.

Further, the impregnation treatment reduces a dirt adhesion property of the surface of the conductive member in addition to the achievement of the requirement (B). Although the reason is not clear, it is considered that the presence of the curable resin in the gap of the rubbers constituting the matrix and the domain changes the surface characteristics of the conductive layer, and reduces the attachment force with the dirt components such as the developer and the external additive present on the surface of the photosensitive member.

The method of the impregnation treatment is not particularly limited, and examples thereof include spraying with a paint obtained by adding a solvent to a raw material, immersion (dipping coating method), and roll coating. The dipping coating method is preferable because it is simple and excellent in production stability. In order to polymerize the monomer after coating, it is preferable to perform an additional treatment such as heating or light radiation, if necessary.

The region of the conductive layer to be impregnated can be controlled by a monomer species to be impregnated, a solvent species for dissolving the monomer, a monomer concentration, an immersion time, and the like.

The region of the impregnation treatment is preferably a region smaller than the above-described second region from the outer surface of the conductive member in order to suppress the discharge unevenness from the outer surface of the conductive member and to simultaneously supply charges between the domain particle phases. That is, the above-described second region is preferably not impregnated.

When an impregnation treatment is performed using rubber and a monomer that does not react or hardly reacts, it is considered that an interpenetrating polymer network is formed. Hereinafter, the interpenetrating polymer network may be referred to as an "IPN network." Since the crosslinked rubber and the curable resin constituting the IPN network basically do not have a chemical bond, rubber elasticity is easily maintained, which is more preferable. That is, the curable resin more preferably forms an interpenetrating polymer network together with the first rubber and the second rubber.

Method for Confirming IPN Network

Examples of a method for confirming that the IPN network is formed include a method for confirming by a scanning electron microscope (SEM) or a transmission electron microscope (TEM), a method by solvent extraction, and a method for confirming by shifting a glass transition point before and after forming the IPN network. In the present disclosure, confirmation is performed by a transmission electron microscope (TEM). A specific method will be described below.

That is, a thin piece of the conductive layer is cut out from the conductive layer to prepare an observation sample. Examples of a method of sectioning include a sharp razor blade, a microtome, and a focused ion beam (FIB) method.

The observation sample is subjected to a treatment (for example, dyeing treatment and vapor deposition treatment) that can facilitate distinction between the rubber and the curable resin, if necessary. Then, observation is performed by a TEM.

Among them, it is preferable to perform observation with a TEM at a magnification of 1,000 to 100,000 from the viewpoint of the accuracy.

Monomer

As the monomer used for the impregnation treatment, it is preferable to use a polyfunctional monomer having a plurality of functional groups having curability in order to form a crosslinked structure. In addition, monofunctional monomers may be combined, if necessary.

Specific examples of the monomer used for the impregnation treatment include an acrylic acid ester, a methacrylic acid ester, a vinyl ether, an epoxide, and an isocyanate. Among them, a (meth)acrylic acid ester is preferable from the viewpoint of high reactivity and high insulating properties. The (meth)acrylic acid ester refers to an acrylic acid ester or a methacrylic acid ester.

The (meth)acrylic acid ester is selected from commonly used known esters, and examples thereof include the following:

- a difunctional (meth)acrylate such as diethylene glycol di(meth)acrylate, dipropylene glycol di(meth)acrylate, triethylene glycol di(meth)acrylate, tripropylene glycol di(meth)acrylate, PO-modified neopentyl glycol di(meth)acrylate, or polyethylene glycol di(meth)acrylate; a trifunctional (meth)acrylate such as trimethylolpropane ethoxy tri(meth)acrylate or glycerin propoxy tri(meth)acrylate; and a tetrafunctional (meth)acrylate such as pentaerythritol tetra(meth)acrylate, pentaerythritol tetraethoxy(meth)acrylate, or trimethylolpropane tetra(meth)acrylate. Among them, at least one selected from the group consisting of PO-modified neopentyl glycol di(meth)acrylate, trimethylolpropane tri(meth)acrylate, pentaerythritol tri(meth)acrylate, and pentaerythritol tetra(meth)acrylate is preferable.

A vinyl ether monomer is selected from commonly used known monomers, and examples thereof include the following: a difunctional vinyl ether such as 1,4-butanediol divinyl ether or cyclohexanedimethanol divinyl ether. Among them, cyclohexanedimethanol divinyl ether is preferable.

An epoxide monomer is selected from commonly used known monomers, and examples thereof include the following: bisphenol A diglycidyl ether, hydrogenated bisphenol A diglycidyl ether, and resorcinol diglycidyl ether. Among them, hydrogenated bisphenol A diglycidyl ether is preferable.

An isocyanate monomer is selected from commonly used known monomers, and examples thereof include the following: toluene diisocyanate (TDI), diphenylmethane diisocyanate (MDI), polymeric diphenylmethane polyisocyanate, polymeric polyphenylene polyisocyanate, hydrogenated MDI, xylylene diisocyanate (XDI), hexamethylene diisocyanate (HDI), and isophorone diisocyanate (IPDI). Among them, at least one selected from the group consisting of toluene diisocyanate (TDI), diphenylmethane diisocyanate (MDI), polymeric diphenylmethane polyisocyanate, and polymeric polyphenylene polyisocyanate is preferable, and polymeric polyphenylene polyisocyanate is more preferable.

The monomer can be confirmed by using infrared spectroscopy (IR) or pyrolysis-gas chromatography-mass spectrometry (Pyr-GCMS).

As the method of polymerizing the above monomer, a known method can be used. Specific examples thereof include thermal polymerization by heating and photopolymerization such as irradiation with ultraviolet rays. For each polymerization method, a known radical polymerization initiator or ionic polymerization initiator can be used. Examples of a thermal polymerization initiator in the case of thermal polymerization include peroxides such as 3-hydroxy-1,1-dimethylbutyl peroxy-neodecanoate, α-cumyl peroxy-neodecanoate, t-butyl peroxy neoheptanoate, t-butyl peroxypivalate, t-amyl peroxy-normal-octoate, t-butylperoxy 2-ethylhexyl carbonate, dicumyl peroxide, di-t-butyl peroxide, di-t-amyl peroxide, 1,1-di(t-butylperoxy) cyclohexane, and n-butyl-4,4-di(t-butylperoxy) valerate; and azo compounds such as 2,2-azobisbutyronitrile, 2,2-azobis(4-methoxy-2,4-dimethylvaleronitrile), 2,2-azobis(2,4-dimethylvaleronitrile), 2,2-azobis(2-methylbutyronitrile), 1,1-azobis(cyclohexane-1-carbonitrile), 2,2-azobis[2-(2-imidazolin-2-yl)propane], 2,2-azobis[2-methyl-N-(2-hydroxyethyl)propionamide], 2,2-azobis[N-(2-propenyl)-2-methylpropionamide], 2,2-azobis(N-butyl-2-methoxypropionamide), and dimethyl-2,2-azobis(isobutyrate).

Examples of a photoradical generator in the case of photopolymerization by irradiation with ultraviolet rays include 2,2-dimethoxy-1,2-diphenylethan-1-one, 1-hydroxycyclohexyl phenyl ketone, 2-hydroxy-2-methyl-1-phenylpropan-1-one, 1-[4-(2-hydroxyethoxy)-phenyl]-2-hydroxy-2-methyl-1-propan-1-one, 2-hydroxy-1-{4-[4-(2-hydroxy-2-methyl-propionyl)-benzyl]-phenyl}-2-methylpropan-1-one, 2-methyl-1-[4-(methylthio)phenyl]-2-morpholinopropan-1-one, 2-benzyl-2-dimethylamino-1-(4-morpholinophenyl)-butan-1-one, 2-dimethylamino-2-(4-methylbenzyl)-1-(4-morpholin-4-yl-phenyl)-butan-1-one, bis(2,4,6-trimethylbenzoyl)-phenylphosphine oxide, and 2,4,6-trimethylbenzoyl-diphenylphosphine oxide.

Examples of a photocationic polymerization initiator in the case of photopolymerization by irradiation with ultraviolet rays include 4-methylphenyl-4-(2-methylpropyl)phenyliodonium hexafluorophosphate, 4-methylphenyl-4-(2-methylpropyl)phenyliodonium hexafluoroantimonate, 4-methylphenyl-4-(2-methylpropyl)phenyliodonium tetrafluoroborate, 4-methylphenyl-4-(1-methylethyl)phenyliodonium hexafluorophosphate, 4-methylphenyl-4-(1-methylethyl)phenyliodonium hexafluoroantimonate, triphenylsulfonium hexafluorophosphate, triphenylsulfonium hexafluoroantimonate, triphenylsulfonium tetrafluoroborate, bis[4-(diphenylsulfonio)phenyl]sulfide bishexafluorophosphate, tetraphenylphosphonium hexafluorophosphate, tetraphenylphosphonium hexafluoroantimonate, and tetraphenylphosphonium tetrafluoroborate.

These polymerization initiators may be used alone or in combination of two or more kinds thereof.

The amount of the polymerization initiator blended is preferably 0.5 to 10 parts by mass with respect to 100 parts by mass of the total amount of the compound for forming a specific resin such as the above monomer (for example, a compound having a (meth)acryloyl group), from the viewpoint of efficiently progressing the reaction.

As the device for heating and the device for irradiation with ultraviolet rays, known devices can be appropriately used. As a light source that emits ultraviolet rays, for example, an LED lamp, a high-pressure mercury lamp, a metal halide lamp, a xenon lamp, a low-pressure mercury lamp, or the like can be used. The integrated light amount required during polymerization can be appropriately adjusted according to the types and addition amounts of the compound to be used and the polymerization initiator.

The domain exposed on the outer surface of the conductive member preferably further contains at least one resin selected from the group consisting of a (meth)acrylic resin, an epoxy resin, a vinyl ether resin, and a urea resin. Among them, a (meth)acrylic resin is more preferable. For example, when the above-described monomer is used in the above-described impregnation treatment, the resin can be contained in the domain. For example, the (meth)acrylic resin is a polymer of a (meth)acrylic acid ester, the epoxy resin is a polymer of an epoxide, the vinyl ether resin is a polymer of a vinyl ether, and the urea resin is a polymer of an isocyanate and an amine.

As described above, the resin preferably forms an interpenetrating polymer network together with the first rubber and the second rubber.

The first region preferably further contains at least one resin selected from the group consisting of a (meth)acrylic resin, an epoxy resin, a vinyl ether resin, and a urea resin. Among them, a (meth)acrylic resin is more preferable. For example, when the above-described monomer is used in the above-described impregnation treatment, the resin can be contained in the first region.

As described above, the resin preferably forms an interpenetrating polymer network together with the first rubber and the second rubber.

Furthermore, it is preferable that the second region does not contain the resin. This makes it easier to achieve the requirement (B). Examples of a method of not allowing the resin to be contained in the second region include changing a composition of an impregnation paint and changing an impregnation time. It can be confirmed by a method described below that the second region does not contain the resin.

Process Cartridge

Figure 2:
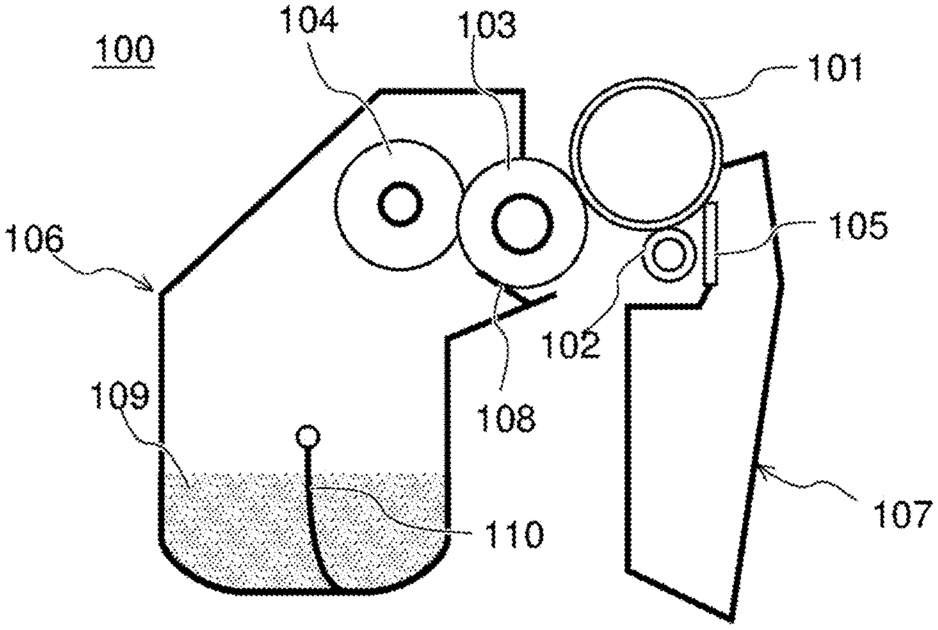
FIG. 2 is a schematic cross-sectional view of a process cartridge.

At least one aspect of the present disclosure provides a process cartridge including the electrophotographic conductive member of the present disclosure. FIG. 2 is a schematic cross-sectional view of an electrophotographic process cartridge 100 including a conductive member according to an embodiment of the present disclosure as a charging roller. The process cartridge is configured to integrate a developing apparatus and a charging apparatus and to be detachably attached to a main body of an electrophotographic image forming apparatus.

The developing apparatus is formed by integrating at least a developing roller 103, a toner container 106, and a toner 109, and may include a toner supply roller 104, a developing blade 108, and a stirring blade 110, if necessary.

The charging apparatus is formed by integrating at least a photosensitive drum 101 and a charging roller 102, and may include a cleaning blade 105 and a waste toner container 107. A voltage is applied to each of the charging roller 102, the developing roller 103, the toner supply roller 104, and the developing blade 108.

The conductive member according to the present disclosure can be used as a charging roller, a developing roller, a developing blade, or a toner supply roller. The conductive member is preferably a charging member, and the conductive member is more preferably a charging roller.

Electrophotographic Image Forming Apparatus

Figure 3:
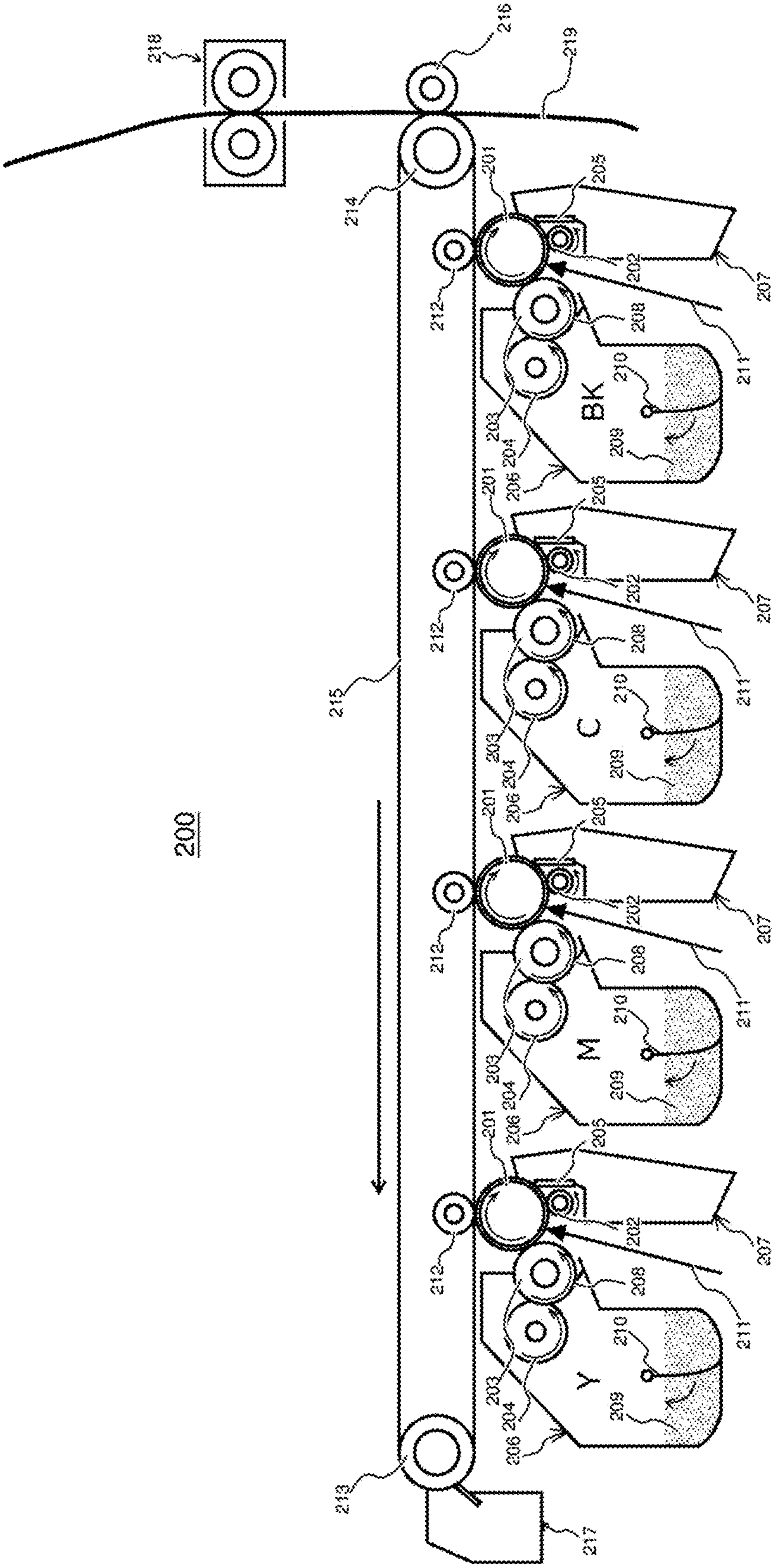
FIG. 3 is a schematic view of an electrophotographic image forming apparatus.

At least one aspect of the present disclosure provides an electrophotographic image forming apparatus including an electrophotographic member of the present disclosure. FIG. 3 is a schematic configuration view of an electrophotographic image forming apparatus 200 using the conductive member according to an embodiment of the present disclosure as a charging roller. The apparatus is a color electrophotographic apparatus to which the process cartridge 100 is detachably attached. In each process cartridge, toners of respective colors of black BK, magenta M, yellow Y, and cyan C are used.

A photosensitive drum 201 rotates in an arrow direction, is uniformly charged by a charging roller 202 to which a voltage is applied from a charging bias power supply, and an electrostatic latent image is formed on a surface thereof by exposure light 211. On the other hand, a toner 209 stored in a toner container 206 is supplied to a toner supply roller 204 by a stirring blade 210 and transported onto a developing roller 203. Then, a surface of the developing roller 203 is uniformly coated with the toner 209 by a developing blade 208 disposed in contact with the developing roller 203, and charges are applied to the toner 209 by triboelectric charging. The above electrostatic latent image is developed by being applied with the toner 209 transported by the developing roller 203 disposed in contact with the photosensitive drum 201, and is visualized as a toner image.

The visualized toner image on the photosensitive drum is transferred to an intermediate transfer belt 215 supported and driven by a tension roller 213 and an intermediate transfer belt driver roller 214 by a primary transfer roller 212 to which a voltage is applied by a primary transfer bias power supply. The toner images of the respective colors are sequentially superimposed to form a color image on the intermediate transfer belt.

A transfer material 219 is supplied into the apparatus by a sheet feeding roller and transported between the intermediate transfer belt 215 and a secondary transfer roller 216. A voltage is applied to the secondary transfer roller 216 from a secondary transfer bias power supply, and the secondary transfer roller transfers the color image on the intermediate transfer belt 215 to the transfer material 219. The transfer material 219 to which the color image is transferred is subjected to a fixing process by a fixing unit 218, and discarded outside the apparatus, and the printing operation is terminated.

On the other hand, the toner remaining on the photosensitive drum without being transferred is scraped off by a cleaning blade 205 and stored in a waste toner storage container 207, and the cleaned photosensitive drum 201 repeats the above-described process. The toner remaining on the primary transfer belt without being transferred is also scraped off by a cleaning device 217.

Although the color electrophotographic apparatus is illustrated as an example, in a monochrome electrophotographic apparatus (not illustrated), the process cartridge is a product only using a black toner. The monochrome image is directly formed on the transfer material by the process cartridge and the primary transfer roller (without the secondary transfer roller) without using the intermediate transfer belt. Thereafter, the sheet is fixed by the fixing unit and discharged to the outside of the apparatus, thereby terminating the printing operation.

EXAMPLES

Hereinafter, the present disclosure will be described based on Examples, but the technical scope of the present disclosure is not limited thereto.

Hereinafter, a charging member in the present disclosure was produced using the following materials.

Elastic Layer Forming Material

NBR

- NBR (1) (trade name: JSR NBR N230SV, acrylonitrile content: 35%, mooney viscosity $ML_{(1+4)}$ 100° C.: 32, SP value: 20.0 $(J/cm^3)^{0.5}$, manufactured by JSR Corporation, abbreviation: N230SV)
- NBR (2) (trade name: Nipol DN401LL, acrylonitrile content: 18.0%, mooney viscosity $ML_{(1+4)}$ 100° C.: 32, SP value: 17.4 $(J/cm^3)^{0.5}$, manufactured by Zeon Corporation, abbreviation: DN401LL)
- NBR (3) (trade name: JSR NBR N215SL, acrylonitrile content: 48%, mooney viscosity $ML_{(1+4)}$ 100° C.: 45, SP value: 21.7 $(J/cm^3)^{0.5}$, manufactured by JSR Corporation, abbreviation: N215SL)

SBR

- SBR (1) (trade name: Tufdene 2000R, styrene content: 25%, mooney viscosity $ML_{(1+4)}$ 100° C.: 45, SP value: 17.0 $(J/cm^3)^{0.5}$, manufactured by Asahi Kasei Corporation., abbreviation: T2000R)
- SBR (2) (trade name: Tufdene 2003, styrene content: 25%, mooney viscosity $ML_{(1+4)}$ 100° C.: 33, SP value: 17.0 $(J/cm^3)^{0.5}$, manufactured by Asahi Kasei Corporation., abbreviation: T2003)

EPDM

- EPDM (trade name: Esprene505A, mooney viscosity $ML_{(1+4)}$ 100° C.: 47, SP value: 16.0 $(J/cm^3)^{0.5}$, manufactured by Sumitomo Chemical Co., Ltd., abbreviation: E505A)

Butadiene Rubber BR

- Butadiene rubber (trade name: UBEPOL BR130B, mooney viscosity $ML_{(1+4)}$ 100° C.: 29, SP value: 16.8 $(J/cm^3)^{0.5}$, manufactured by UBE Corporation, abbreviation: BR130B)

Isoprene Rubber IR

- Isoprene rubber (trade name: Nipol 2200L, mooney viscosity $ML_{(1+4)}$ 100° C.: 70, SP value: 16.5 $(J/cm^3)^{0.5}$, manufactured by Zeon Corporation, abbreviation: 2200L)

Hydrin Rubber EO-EP-AGE Ternary Co-Compound (GECO)

- Hydrin rubber (trade name: EPICHLOMER CG102, mooney viscosity $ML_{(1+4)}$ 100° C.: 55, SP value: 18.5 $(J/cm^3)^{0.5}$, manufactured by OSAKA SODA CO., LTD., abbreviation: CG102)

Conductive Particle

- Carbon black (1) (trade name: TOKABLACK #7270SB, DBP absorption amount: 62 $cm^3$/100 g, manufactured by Tokai Carbon Co., Ltd., abbreviation: #7270)
- Carbon black (2) (trade name: TOKABLACK #7360SB, DBP absorption amount: 87 $cm^3$/100 g, manufactured by Tokai Carbon Co., Ltd., abbreviation: #7360)
- Carbon black (3) (trade name: Raven1170, DBP absorption amount: 55 $cm^3$/100 g, manufactured by Columbia Chemical Corporation, abbreviation: R1170)

Vulcanizing Agent

- Vulcanizing agent (trade name: SULFAX PMC, sulfur content 97.5%, manufactured by Tsurumi Chemical Industry Co., ltd., abbreviation: sulfur)

Vulcanization Accelerator

- Vulcanization accelerator (1) (trade name: SANCELER TBZTD, tetrabenzylthiuram disulfide, manufactured by SANSHIN CHEMICAL INDUSTRY CO., LTD., abbreviation: TBzTD)
- Vulcanization accelerator (2) (trade name: NOCCELER EP-60, vulcanization accelerator mixture, manufactured by OUCHI SHINKO CHEMICAL INDUSTRIAL CO., LTD., abbreviation: EP-60)
- Vulcanization accelerator (3) (trade name: NOCCELER TBT, tetrabutylthiuram disulfide, manufactured by OUCHI SHINKO CHEMICAL INDUSTRIAL CO., LTD., abbreviation: TBT)

Vulcanization accelerator (4) (trade name: NOCCELER TS, tetramethylthiuram monosulfide, manufactured by OUCHI SHINKO CHEMICAL INDUSTRIAL CO., LTD., abbreviation: TS)

Vulcanization accelerator (5) (trade name: ACCEL CZ, N-cyclohexyl-2-benzothiazolylsulfenamide, manufactured by Kawaguchi Chemical Industry Co., Ltd., abbreviation: Cz)

Vulcanization accelerator (6) (trade name: NOCRAC MB, 2-mercaptobenzimidazole, manufactured by OUCHI SHINKO CHEMICAL INDUSTRIAL CO., LTD., abbreviation: MB) Filler Filler (1) (trade name: NANOX #30, calcium carbonate, manufactured by MARUO CALCIUM CO., LTD., abbreviation: #30)

Filler (2) (Thermax flow foam N990, manufactured by CanCab Limited, abbreviation: MT)

Resin Particle

PE particle (trade name: MIPELON XM-221U, polyethylene resin, average particle size: 25 μm, manufactured by Mitsui Chemicals, Inc., abbreviation: PE) Impregnation Treatment Material Monomer Acrylic monomer 1 (trade name: EBECRYL 145, PO-modified neopentyl glycol diacrylate, manufactured by DAICEL-ALLNEX LTD., abbreviation: acryl 1)

Acrylic monomer 2 (trade name: A-TMPT, trimethylolpropane triacrylate, manufactured by SHIN-NAKAMURA CHEMICAL CO, LTD., abbreviation: acryl 2)

Acrylic monomer 3 (trade name: PETIA, pentaerythritol (tri/tetra) acrylate, manufactured by DAICEL-ALLNEX LTD., abbreviation: acryl 3)

Vinyl ether monomer (trade name: CHDVE, cyclohexanedimethanol divinyl ether, NIPPON CARBIDE INDUSTRIES CO., INC., abbreviation: vinyl ether)

Glycidyl ether monomer (trade name: DENACOL EX-252, hydrogenated bisphenol A diglycidyl ether, manufactured by Nagase ChemteX Corporation, abbreviation: epoxide)

Isocyanate monomer (trade name: Millionate MR-100, polymeric polyphenylene polyisocyanate, manufactured by Tosoh Corporation, abbreviation: isocyanate)

Here, the pentaerythritol (tri/tetra) acrylate refers to a mixture of pentaerythritol triacrylate and pentaerythritol tetraacrylate.

Photopolymerization Initiator

Photoradical polymerization initiator (trade name: Omnirad 127, 2-hydroxy-1-{4-[4-(2-hydroxy-2-methyl-propionyl)-benzyl]-phenyl}-2-methyl-propan-1-one, manufactured by IGM Resins B.V., abbreviation: radical)

Photocationic polymerization initiator (trade name: ADEKA ARKLS SP150, sulfonium salt-based photocationic polymerization initiator, manufactured by ADEKA Corporation, abbreviation: cation)

Example 1

Production of Conductive Member 1

1-1. Preparation of Rubber Composition for Forming Domain (CMB)

The materials of the types and amounts shown in Table 2 were mixed with a pressure kneader to obtain a rubber composition for forming a domain (CMB). The mixing conditions were a filling rate of 70 vol %, a blade rotation speed of 30 rpm, and 18 minutes.

TABLE 2

| | Raw material name | Blending amount (parts by mass) |
|---|---|---|
| Second rubber | NBR (trade name: NBR N230SV, manufactured by ENEOS Materials Corporation) | 100 |
| Conductive particle | Carbon black (trade name: TOKABLACK #7270SB, manufactured by Tokai Carbon Co., Ltd.) | 70 |
| Vulcanization acceleration aid | Zinc oxide (trade name: 2 types of zinc oxide, manufactured by SAKAI CHEMICAL INDUSTRY CO., LTD.) | 5 |
| Processing aid | Zinc stearate (trade name: Zinc stearate, manufactured by NOF Corporation) | 1 |

1-2. Preparation of Rubber Composition for Forming Matrix (MRC)

The materials of the types and amounts shown in Table 3 were mixed with a pressure kneader to obtain a rubber composition for forming a matrix (MRC). The mixing conditions were a filling rate of 70 vol %, a blade rotation speed of 30 rpm, and 18 minutes.

TABLE 3

| | Raw material name | Blending amount (parts by mass) |
|---|---|---|
| First rubber | SBR (trade name: Tufdene 2000R, manufactured by Asahi Kasei Corporation) | 100 |
| Filler | Calcium carbonate (trade name: NANOX #30, manufactured by MARUO CALCIUM CO., LTD.) | 45 |
| Vulcanization acceleration aid | Zinc oxide (trade name: 2 types of zinc oxide, manufactured by SAKAI CHEMICAL INDUSTRY CO., LTD.) | 5 |
| Processing aid | Zinc stearate (trade name: Zinc stearate, manufactured by NOF Corporation) | 1 |

1-3. Preparation of Rubber Composition 1 for Forming Conductive Layer

The materials of the types and amounts shown in Table 4 were mixed with an open roll to prepare a rubber composition 1 for forming a conductive member. As a mixer, an open roll having a roll diameter of 12 inches was used. As the mixing conditions, a front roll rotation speed was set to 10 rpm, a rear roll rotation speed was set to 8 rpm, and a left and right cut-back was performed 20 times in total with a roll gap of 2 mm, and then thin cutting was performed 10 times with a roll gap of 1.0 mm.

TABLE 4

| | Raw material name | Blending amount (parts by mass) |
|---|---|---|
| Domain raw material | Rubber composition for forming domain (CMB) in Table 1 | 27 |
| Matrix raw material | Rubber composition for forming matrix (MRC) in Table 2 | 73 |
| Vulcanizing agent | Sulfur (trade name: SULFAX PMC, sulfur | 2 |

TABLE 4-continued

| | Raw material name | Blending amount (parts by mass) |
|---|---|---|
| | content 97.5%, manufactured by Tsurumi Chemical Industry Co., ltd.) | |
| Vulcanization accelerator 1 | Tetrabenzylthiuram disulfide (trade name: SANCELER TBzTD, manufactured by SANSHIN CHEMICAL INDUSTRY CO., LTD.) | 1 |
| Vulcanization accelerator 2 | N-cyclohexyl-2-benzothiazolylsulfenamide (trade name: ACCEL CZ, manufactured by Kawaguchi Chemical Industry Co., Ltd.) | 1 |

1-4. Molding of Conductive Elastic Roller 1

A round bar having a total length of 244 mm and an outer diameter of 6 mm was prepared by subjecting a surface of free-cutting steel to an electroless nickel plating treatment. Next, using a roll coater, an adhesive (trade name: Metaloc U-20, manufactured by TOYOKAGAKU KENKYUSHO CO., LTD.) was applied over the entire circumference of a range of 222 mm excluding both ends of the round bar by 11 mm to prepare a support.

Next, a die having an inner diameter of 12.5 mm was attached to the tip of a crosshead extruder having a supply mechanism of a support and a discharge mechanism of an unvulcanized rubber roller, the temperatures of the extruder and the crosshead were adjusted to 100° C., and a transporting speed of the conductive support was adjusted to 60 mm/sec. Under these conditions, the rubber composition for forming a conductive member was supplied from the extruder, and the outer peripheral portion of the support was coated with the rubber composition for forming a conductive member in the crosshead to obtain an unvulcanized rubber roller.

Next, the unvulcanized rubber roller was charged into a hot air vulcanizing furnace at 160° C. and heated for 60 minutes to vulcanize a layer of the unvulcanized rubber composition, thereby obtaining a roller in which a conductive resin layer was formed on the outer peripheral portion of the conductive support. Thereafter, both ends of the conductive resin layer were cut out by 10 mm to set a length of the conductive resin layer portion in the longitudinal direction to 224 mm.

Then, the surface of the conductive resin layer was polished with a rotating grindstone. As a result, a conductive elastic roller 1 having a diameter of 8.44 mm at each position of 90 mm from the central portion to both ends and a diameter of 8.5 mm at the central portion was produced.

1-5. Preparation of Impregnation Paint 1 and Production of Conductive Member 1

The materials of the types and amounts shown in Table 5 were mixed and dissolved to prepare an impregnation paint 1. The conductive elastic roller 1 was immersed in the impregnation paint 1 for 4 seconds to be impregnated with an acrylic monomer component. Thereafter, air drying was performed at normal temperature for 30 minutes, and drying was performed at 90° C. for 1 hour to volatilize the solvent. The dried conductive elastic roller 1 was irradiated with ultraviolet rays so that the integrated light amount was 15,000 mJ/cm$^2$ while being rotated to cure the acrylic monomer, thereby performing the impregnation treatment. A high-pressure mercury lamp (trade name: Handy type UV curing device, manufactured by Marionetwork) was used as an ultraviolet radiation device. Thus, the conductive member 1 according to Example 1 was produced.

TABLE 5

| | Raw material name | Blending amount (parts by mass) |
|---|---|---|
| Monomer | Acrylic monomer (trade name: EBECRYL 145, manufacture by DAICEL-ALLNEX LTD.) | 4 |
| Photopolymerization initiator | Photoradical polymerization initiator (trade name: Omnirad 127, manufactured by IGM Resins B.V.) | 0.35 |
| Solvent | Solvent (trade name: methyl ethyl ketone, manufactured by Kishida Chemical Co., Ltd.) | 100 |

2. Characteristic Evaluation 2-1. Impedance Measurement

The impedance was measured by the following measurement method.

First, as a pretreatment, a deposited platinum film (electrode) having a thickness of 80 nm was formed on the outer surface of the charging roller, which is a conductive member, while the charging roller was rotated. At this time, an electrode having a width of 1.5 cm and being uniform in the circumferential direction was produced using a masking tape. By forming the electrode, the contribution of the contact area between the measurement electrode and the conductive member can be reduced as much as possible by the surface roughness of the conductive member. Next, an aluminum sheet was wound around the electrode without any gap to form a measurement sample illustrated in FIGS. 4A and 4B.

Then, an impedance measurement device (trade name: Solartron 1260 96 W, manufactured by Solartron Metrology) was connected from the aluminum sheet to the measurement electrode or to the support. The impedance was measured at a vibration voltage of 1 Vpp and a frequency of 1.0 Hz under an environment of a temperature of 23° C. and a relative humidity of 50% to obtain an absolute value of the impedance.

The charging roller (length in the longitudinal direction: 224 mm) was divided into five regions in the longitudinal direction into five equal parts, measurement electrodes were formed at arbitrary one point from each region, that is, at five points in total, and the above measurement was performed. An arithmetic average value thereof was taken as the impedance of the conductive member.

The impedance of the conductive member 1 was 5.8×10$^6$Ω. The results are shown in Table 10.

2-2. Measurement of Perimeter and Envelope Perimeter of Domain and Number of Domains in Conductive Layer The perimeter and the envelope perimeter of the domain may be measured as follows. First, the conductive layer of the conductive member was cut out as a piece having a thickness of about 2 μm at a cutting temperature of −100° C. using a microtome (trade name: Leica EM FCS, manufactured by Leica Microsystems GmbH). A piece was cut out from the sample at three locations (that is, L1/4, L2/4, and L3/4) in total including the center of the conductive layer in the longitudinal direction and two locations of L/4 from both ends of the conductive layer toward the center, where L is the length of the conductive layer in the longitudinal direction of the conductive member 1. The direction in which the piece is cut out is a direction that provides a cross section perpendicular to the longitudinal direction of the conductive layer.

Platinum deposition was performed on the cut flat surface using the piece. Next, a cross-sectional image was obtained by imaging at a magnification of 5,000 using a scanning electron microscope (SEM) (trade name: S-4800, manufactured by Hitachi High-Tech Corporation). The obtained image was subjected to 8-bit gray scaling using image processing software (trade name: ImageProPlus, manufactured by Media Cybernetics, Inc.) to obtain a monochrome image with 256 levels of gray. Next, the monochrome image was inverted so that the domain in the monochrome image became white, and a binarization threshold was set on the brightness distribution of the image based on Otsu's discriminant analysis algorithm to obtain a binarized image.

In the binarized image, a 15 μm square region was cut out, and the perimeter and the envelope perimeter were calculated using the counting function of the image processing software. A value of A/B was calculated using the perimeter A and the envelope perimeter B calculated for each of the domains observed in each observation region, and a proportion (number %) of the domains in which the value of A/B was 1.00 to 1.10 among all the observed domains was obtained. In addition, the arithmetic mean value of A and the number of domains of three observation regions were calculated from all the observed domains.

Next, an observation position of each piece section will be described. When 15 μm square observation regions were placed at three locations of the thickness region from the outer surface of each piece to a depth of 0.1 T to 0.9 T or less, where T is a thickness of the conductive layer, A and B were measured at a total of nine observation regions, and an arithmetic average value of the values of A/B was calculated using the values of A and B at these nine locations, and was defined as A/B.

The proportion of domains having a value of A/B of 1.00 to 1.10 in the conductive member 1 was 85%, and the arithmetic average value of the values of A/B was 1.06. The results are shown in Table 10.

2-3. Measurement of Volume Resistivities R1 and R2 of Domains Exposed on Outer Surface of Elastic Layer and Volume Resistivity ρm of Matrix in Elastic Layer The measurement of volume resistivities R1 and R2 of the domains exposed on the outer surface of the elastic layer and the volume resistivity of the matrix in the elastic layer may be performed as follows.

Specifically, current measurement in SIS-AFM mode was performed using a scanning probe microscope (SPM) (trade name: E-sweep, manufactured by Hitachi High-Tech Corporation) in consideration of the softness of the sample. As an SPM cantilever, SI-DF3-R was used.

First, an ultrathin piece having a thickness of 1 μm was cut out from the section of the conductive layer including the surface of the conductive member 1 in the thickness direction at a cutting temperature of −100° C. using a microtome (trade name: Leica EM FCS, manufactured by Leica Microsystems GmbH). The cutting of the ultrathin piece was performed in a direction of the cross section perpendicular to the longitudinal direction of the conductive member (that is, the thickness direction of the conductive layer) based on the direction in which charges were transported for discharge.

Next, the ultrathin piece was placed on a metal plate under an environment of a temperature of 23° C. and a relative humidity of 50%. The vicinity of the surface of the piece was observed with the above SPM, and the domain exposed on the outer surface of the elastic layer was specified in the phase image. Thereafter, a current value image was acquired by applying 0.5 V with respect to a portion other than the conductive particle in the first region and a portion other than the conductive particle in the second region in the cross section. Then, the volume resistivity r1 in the first region and the volume resistivity r2 in the second region were calculated from the acquired current value image and the thickness of the piece.

The above procedure was performed in the same manner for the following points. That is, the conductive layer of the conductive member 1 (length in the longitudinal direction: 224 mm) was divided into five equal parts in the longitudinal direction and further divided into four equal parts in the circumferential direction, and a total of 20 thin piece samples were cut out one by one from each region. For each thin piece sample, measurement was performed at a total of 60 locations for each of the volume resistivity r1 and r2 at three locations of the domain exposed on the surface. The arithmetic average values of the volume resistivities r1 and r2 were defined as volume resistivities R1 and R2, respectively.

Here, as described above, the first region is a region having a thickness of 0.1×Ld on the side farthest from the support in the cross section of the domain exposed on the outer surface, and the second region is a region having a thickness of 0.1×Ld on the side closest to the support in the cross section of the domain exposed on the outer surface, where Ld is the maximum length of the domain exposed on the outer surface in the thickness direction of the conductive layer.

The volume resistivity of the matrix in the conductive layer was measured as follows. That is, the volume resistivity was measured in the same manner as in the above-described method at three locations in the matrix portion of the thickness region from the outer surface to a depth of 0.1 T to 0.9 T of each prepared piece, that is, at nine locations in total, where T is the thickness of the conductive layer. The arithmetic average value thereof was taken as the volume resistivity of the matrix.

The volume resistivity of the domain in the conductive layer was measured as follows. That is, in the measurement of the volume resistivity of the above matrix, the volume resistivity of the domain was measured in the same manner as described above, except that the measurement was performed at a location corresponding to the domain of the ultrathin piece including the conductive particle portion.

In the conductive member 1, R1 was $3.1\times10^{9}$ Ω·cm, R2 was $4.2\times10^{8}$ Ω·cm, the relationship of R1>R2 was satisfied, and R1/R2 was 7.4. A volume resistivity of the matrix was $9.1\times10^{13}$ Ω·cm. The results are shown in Tables 10 and 11.

2-4. Calculation of Ratio ($S_c$/S) of Cross-Sectional Area of Conductive Particle Contained in Domain to Cross-Sectional Area of Domain Using the piece subjected to platinum deposition prepared in 2.2 above, a cross-sectional image was obtained by imaging at a magnification of 20,000 using a scanning electron microscope (SEM) (trade name: S-4800, manufactured by Hitachi High-Tech Corporation). Next, binarization was performed using image analysis software (product name: ImageProPlus, manufactured by Media Cybernetics, Inc.) so that carbon black in the domain was distinguished. Furthermore, an observation region having a size in which one domain was accommodated was extracted from the obtained binarized image, and a cross-sectional area S of the domain and a cross-sectional area $S_c$ of carbon black as the conductive particle contained in the domain were calculated by using the counting function. Then, the cross-sectional area ratio of the conductive particle in the domain was calculated by $S_c/S$.

$S_c/S$ of the conductive member 1 was 28.0 area %. The results are shown in Table 10.

2-5. Method for Confirming Interpenetrating Polymer Network (IPN)

An interpenetrating polymer network (IPN) can be confirmed, for example, by the following method.

An ultrathin piece having a thickness of 100 nm was cut out from the section including the surface of the conductive member 1 at a cutting temperature of −100° C. using a microtome (trade name: Leica EM FCS, manufactured by Leica Microsystems GmbH). The cutting of the ultrathin piece was performed in a direction of the cross section perpendicular to the longitudinal direction of the conductive member based on the direction in which charges were transported for discharge.

The prepared piece was dyed using a dyeing agent, the domain portion was specified using a transmission electron microscope (trade name: H-7100FA, manufactured by Hitachi, Ltd.), and then the first region and the second region of the cross section were imaged. Examples of the dyeing agent include osmium tetroxide, ruthenium tetroxide, and phosphotungstic acid. Similarly, the matrix existing at the same depth as those of the first region and the second region from the outer surface of the conductive layer was also imaged in the same manner. In the case of the conductive member 1, the rubber portion was dyed by using osmium tetroxide as a dyeing agent, and it was possible to confirm an interpenetrating polymer network (IPN). The rubber portion dyed by a reaction of a double bond between osmium tetroxide and rubber was observed to be black, whereas a curable resin portion constituting the interpenetrating polymer network (IPN) was observed to be white. Therefore, it was determined that the rubber portion had an interpenetrating polymer network.

The monomer of the curable resin constituting the interpenetrating polymer network (IPN) was confirmed by taking out a piece of the impregnated region in the conductive layer, adding an organic alkali reagent, for example, tetramethylammonium hydroxide (TMAH), and using pyrolysis-gas chromatography-mass spectrometry (Pyr-GCMS). In the first region of the conductive member 1, an interpenetrating polymer network (IPN) of the curable resin using acryl 1 as a monomer was confirmed. In addition, no interpenetrating polymer network was confirmed in the second region. The results are shown in Table 11.

3. Evaluation as Charging Member

Using the conductive member 1 as a charging roller, fogging performance under a low charging bias condition was evaluated as follows.

A laser printer (trade name: HP LaserJet Pro M404, manufactured by HP Development Company, L.P.) was prepared as an electrophotographic image forming apparatus. Then, the conductive member 1 was mounted as a charging roller of the process cartridge for the laser printer. Further, the main body of the above laser printer was modified so that any voltage from an external power source (trade name: Model615, manufactured by Trek Bicycle Corporation) was applied to the charging roller, the developing roller, and the intermediate transfer belt.

Next, in order to bring the main body of the above laser printer and the above process cartridge into a measurement environment, the main body and the process cartridge were allowed to stand under a high temperature and high humidity environment (HH environment) at a temperature of 30° C. and a relative humidity of 80% for 48 hours. Next, the above process cartridge was then loaded on the main body of the laser printer. Then, an external power source was set so that a charging roller photosensitive member unexposed portion (Vd) was 350 V, a photosensitive member exposed portion (Vl) was 100 V, and a developing bias was 175 V, and −(minus) 800 V was applied as the charging bias to the charging roller. Then, a white solid image was output under the HH environment. The obtained white solid image was evaluated by the following method. Note that the evaluation result at this time is also referred to as the "number of initial fogging".

Method for Evaluating Fogging

Nine points of the white solid image were observed with an optical microscope at a magnification of 500, the number of black spots caused by the toner particle existing in a 1 mm square observation region was counted, and the number of black spots was defined as the number of fogging on paper.

The number of initial fogging was 187 when the conductive member 1 was used as a charging roller. The fogging after endurance was 123%. The results are shown in Table 11.

In the present example, the setting of the number of initial fogging to preferably 250 or less, and particularly 200 or less, and the suppression of a proportion of the number of fogging after endurance to the number of initial fogging to 130% or less, and particularly 115% or less were used as indices of the effectiveness of the disclosure of the present application.

Next, under the same environment, 10,000 sheets of images were formed by printing the letters "E" of the alphabet having a size of 4 point so that a coverage ratio was 1% with respect to the area of the A4 size sheet using the above laser printer while maintaining the image forming conditions. Thereafter, the conductive member 1 was removed from the process cartridge and incorporated into a new process cartridge as a charging roller. Thereafter, one white solid image was output under the same conditions as in the "number of initial fogging." The fogging on the obtained white solid image was observed and evaluated by the following method for evaluating fogging. The evaluation result at this time is also referred to as the "number of fogging after endurance". The proportion of the number of fogging after endurance to the number of initial fogging was defined as fogging after endurance (%).

Here, the developer mounted on the above laser printer is negatively chargeable. Therefore, when the white solid image is output, the developer is not originally transferred onto the photosensitive member and the paper. However, as described above, under the low charging bias condition, an excessively charged portion may be generated on the surface of the photosensitive member due to locally strong discharge from the charging member. A small amount of positively charged developer present in the developer is transferred to the overcharged portion of the photosensitive member, and as a result, even in a case where a white solid image is formed, a black spot derived from the developer is observed, and so-called "reverse fogging" occurs in the white solid image. This phenomenon is remarkably likely to occur under the low charging bias condition. The fogging after endurance also includes fogging caused by dirt adhering to the surface of the conductive member 1 due to the durable use of the conductive member 1.

Examples 2 to 23

Conductive members 2 to 23 were produced in the same manner as that of Example 1 except for changing the blending so that CMB was blended as shown in Table 6, MRC was blended as shown in Table 7, the conductive rubber composition was blended as shown in Table 8, the impregnation paint was blended as shown in Table 9, and the conductive layer was blended as shown in Table 10. Then, evaluation was performed in the same manner as in Example 1. The results are shown in Tables 10 and 11.

Example 24

The blending was changed so that CMB was blended as shown in Table 6, MRC was blended as shown in Table 7, the conductive rubber composition was blended as shown in Table 8, the impregnation paint was blended as shown in Table 9, and the conductive layer was blended as shown in Table 10, and a molding method of a conductive elastic roller 24 was changed as follows. Except for the above, a conductive member 24 was produced in the same manner as that of Example 1. Then, evaluation was performed in the same manner as in Example 1. The results are shown in Tables 10 and 11.

1-6. Molding of Conductive Elastic Roller 24

A round bar having a total length of 244 mm and an outer diameter of 6 mm was prepared by subjecting a surface of free-cutting steel to an electroless nickel plating treatment. Next, using a roll coater, an adhesive (trade name: Metaloc U-20, manufactured by TOYOKAGAKU KENKYUSHO CO., LTD.) was applied over the entire circumference of a range of 222 mm excluding both ends of the round bar by 11 mm to prepare a support.

Next, a conductive rubber composition 24 was coated using a crosshead extruder (manufactured by MITSUBA MFG. CO., LTD.) to prepare an unvulcanized rubber roller having a crown shape. A die having an inner diameter of 8.5 mm was attached to the tip of the crosshead. A molding temperature was set to 100° C. for each of the cylinder, the screw, and the crosshead. The support was transported while changing a transporting speed in order to form a crown shape, and the arithmetic average speed in molding one charging roller was adjusted to be 47 mm/sec. At a die outlet, the conductive rubber flows out at the same speed as that of the core metal, and thus the average flow rate at the time of molding one roller is 47 mm/sec, which is the same as the transporting speed of the support. A rotation speed of the screw was adjusted so that an outer diameter of the unvulcanized rubber roller was 8.6 mm at the longitudinal center with respect to the transporting speed of the above support. The molded unvulcanized rubber roller had a crown shape, the outer diameter at the longitudinal center was 8.5 mm, and the outer diameter at a position of +90 mm from the longitudinal center position to both ends was 8.44 mm.

Thereafter, the unvulcanized rubber roller was vulcanized by heating at a temperature of 160° C. for 60 minutes in an electric furnace, both ends were cut out, and the length of the conductive rubber formed in the axial direction was set to 224 mm to prepare a conductive elastic roller 24.

Comparative Examples 1 to 4

Conductive members 25 to 28 were produced in the same manner as that of Example 1 except for changing the blending so that CMB was blended as shown in Table 6, MRC was blended as shown in Table 7, the conductive rubber composition was blended as shown in Table 8, the impregnation paint was blended as shown in Table 9, and the conductive layer was blended as shown in Table 10. Then, evaluation was performed in the same manner as in Example 1. The results are shown in Tables 10 and 11.

TABLE 6

| | Second rubber | | | | | Conductive particle | | | Zinc oxide | Zinc stearate |
|---|---|---|---|---|---|---|---|---|---|---|
| CMB No. | Rubber type | Grade | Mooney viscosity | SP value | Number of parts | Abbreviation | DBP absorption amount | Number of parts | Number of parts | Number of parts |
| 1 | NBR | N230SV | 32 | 20.0 | 100 | #7270 | 62 | 70 | 5 | 1 |
| 2 | NBR | N230SV | 32 | 20.0 | 100 | #7270 | 62 | 85 | 5 | 1 |
| 3 | NBR | N230SV | 32 | 20.0 | 100 | #7270 | 62 | 100 | 5 | 1 |
| 4 | NBR | N230SV | 32 | 20.0 | 100 | #7270 | 62 | 70 | 5 | 1 |
| 5 | NBR | DN401LL | 32 | 17.4 | 100 | #7270 | 62 | 70 | 5 | 1 |
| 6 | NBR | N215SL | 45 | 21.7 | 100 | #7270 | 62 | 70 | 5 | 1 |
| 7 | SBR | T2003 | 33 | 17.0 | 100 | #7270 | 62 | 70 | 5 | 1 |
| 8 | SBR | T2003 | 33 | 17.0 | 100 | #7270 | 62 | 70 | 5 | 1 |
| 9 | SBR | T2003 | 33 | 17.0 | 100 | #7270 | 62 | 70 | 5 | 1 |
| 10 | SBR | T2003 | 33 | 17.0 | 100 | #7270 | 62 | 70 | 5 | 1 |
| 11 | SBR | T2003 | 33 | 17.0 | 100 | #7270 | 62 | 70 | 5 | 1 |
| 12 | SBR | T2003 | 33 | 17.0 | 100 | #7270 | 62 | 70 | 5 | 1 |
| 13 | SBR | T2003 | 33 | 17.0 | 100 | #7270 | 62 | 70 | 5 | 1 |
| 14 | SBR | T2003 | 33 | 17.0 | 100 | #7270 | 62 | 70 | 5 | 1 |
| 15 | BR | BR130B | 29 | 16.8 | 100 | #7270 | 62 | 70 | 5 | 1 |
| 16 | BR | BR130B | 29 | 16.8 | 100 | #7360 | 87 | 60 | 5 | 1 |
| 17 | BR | BR130B | 29 | 16.8 | 100 | R1170 | 55 | 60 | 5 | 1 |
| 18 | NBR | N215SL | 45 | 21.7 | 100 | #7270 | 62 | 70 | 5 | 1 |
| 19 | SBR | T2003 | 33 | 17.0 | 100 | #7270 | 62 | 70 | 5 | 1 |
| 20 | SBR | T2003 | 33 | 17.0 | 100 | #7270 | 62 | 70 | 5 | 1 |
| 21 | NBR | DN401LL | 32 | 17.4 | 100 | #7270 | 62 | 70 | 5 | 1 |
| 22 | EPDM | E505A | 47 | 16.0 | 100 | #7270 | 62 | 70 | 5 | 1 |
| 23 | IR | 2200L | 70 | 16.5 | 100 | #7270 | 62 | 70 | 5 | 1 |
| 24 | SBR | T2003 | 33 | 17.0 | 100 | #7270 | 62 | 70 | 5 | 1 |
| 25 | NBR | N230SV | 32 | 20.0 | 100 | #7360 | 87 | 47 | 5 | 1 |
| 26 | SBR | T2003 | 33 | 17.0 | 100 | #7270 | 62 | 50 | 5 | 1 |
| 27 | NBR | N230SV | 32 | 20.0 | 100 | #7270 | 62 | 70 | 5 | 1 |
| 28 | NBR | N230SV | 32 | 20.0 | 100 | #7270 | 62 | 70 | 5 | 1 |

TABLE 7

| MRC No. | First rubber: Rubber type | First rubber: Grade | First rubber: Mooney viscosity | First rubber: SP value | First rubber: Number of parts | Filler: Abbreviation | Filler: Number of parts | Zinc oxide: Number of parts | Zinc stearate: Number of parts | Coarse particle: Abbreviation | Coarse particle: Number of parts |
|---|---|---|---|---|---|---|---|---|---|---|---|
| 1 | SBR | T2000R | 45 | 17.0 | 100 | # 30 | 45 | 5 | 1 | — | — |
| 2 | SBR | T2003 | 33 | 17.0 | 100 | # 30 | 45 | 5 | 1 | — | — |
| 3 | SBR | T2000R | 45 | 17.0 | 100 | # 30 | 45 | 5 | 1 | — | — |
| 4 | SBR | T2000R | 45 | 17.0 | 100 | # 30 | 45 | 5 | 1 | PE | 4 |
| 5 | SBR | T2000R | 45 | 17.0 | 100 | # 30 | 45 | 5 | 1 | — | — |
| 6 | SBR | T2000R | 45 | 17.0 | 100 | # 30 | 45 | 5 | 1 | — | — |
| 7 | NBR | N230SV | 32 | 20.0 | 100 | # 30 | 45 | 5 | 1 | — | — |
| 8 | NBR | N230SV | 32 | 20.0 | 100 | # 30 | 45 | 5 | 1 | — | — |
| 9 | NBR | N230SV | 32 | 20.0 | 100 | # 30 | 45 | 5 | 1 | — | — |
| 10 | NBR | N230SV | 32 | 20.0 | 100 | # 30 | 45 | 5 | 1 | — | — |
| 11 | NBR | N230SV | 32 | 20.0 | 100 | # 30 | 45 | 5 | 1 | — | — |
| 12 | NBR | N230SV | 32 | 20.0 | 100 | # 30 | 45 | 5 | 1 | — | — |
| | | | | | | MT | 25 | | | | |
| 13 | NBR | DN401LL | 32 | 17.4 | 100 | # 30 | 45 | 5 | 1 | — | — |
| 14 | NBR | N215SL | 45 | 21.7 | 100 | # 30 | 45 | 5 | 1 | — | — |
| 15 | NBR | N230SV | 32 | 20.0 | 100 | # 30 | 45 | 5 | 1 | — | — |
| 16 | NBR | N230SV | 32 | 20.0 | 100 | # 30 | 45 | 5 | 1 | — | — |
| 17 | NBR | N230SV | 32 | 20.0 | 100 | # 30 | 45 | 5 | 1 | — | — |
| 18 | EPDM | E505A | 47 | 16.0 | 100 | # 30 | 45 | 5 | 1 | — | — |
| 19 | EPDM | E505A | 47 | 16.0 | 100 | # 30 | 45 | 5 | 1 | — | — |
| 20 | IR | 2200L | 70 | 16.5 | 100 | # 30 | 45 | 5 | 1 | — | — |
| 21 | BR | BR130B | 29 | 16.8 | 100 | # 30 | 45 | 5 | 1 | — | — |
| 22 | SBR | T2000R | 55 | 17.0 | 100 | # 30 | 45 | 5 | 1 | — | — |
| 23 | SBR | T2000R | 45 | 17.0 | 100 | # 30 | 45 | 5 | 1 | — | — |
| 24 | NBR | N230SV | 32 | 20.0 | 100 | # 30 | 45 | 5 | 1 | — | — |
| 25 | — | — | — | — | — | — | — | — | — | — | — |
| 26 | NBR | N230SV | 32 | 20.0 | 100 | # 30 | 45 | 5 | 1 | — | — |
| 27 | GECO | CG102 | 32 | 18.5 | 100 | # 30 | 45 | 5 | 1 | — | — |
| 28 | SBR | T2000R | 45 | 17.0 | 100 | # 30 | 45 | 5 | 1 | — | — |

TABLE 8

| Conductive rubber composition No. | Blending: CMB Number of parts | Blending: MRC Number of parts | SP value difference | Vulcanization system: Vulcanizing agent: product name | Vulcanizing agent: Number of parts | Vulcanization accelerator: product name | Number of parts | product name | Number of parts |
|---|---|---|---|---|---|---|---|---|---|
| 1 | 27 | 73 | 3.0 | Sulfur | 2.0 | TBzTD | 1.0 | Cz | 1 |
| 2 | 27 | 73 | 3.0 | Sulfur | 2.0 | TBzTD | 1.0 | Cz | 1 |
| 3 | 25 | 75 | 3.0 | Sulfur | 2.0 | TBzTD | 1.0 | Cz | 1 |
| 4 | 30 | 70 | 3.0 | Sulfur | 2.0 | TBzTD | 1.0 | Cz | 1 |
| 5 | 35 | 65 | 0.4 | Sulfur | 2.0 | TBzTD | 1.0 | Cz | 1 |
| 6 | 25 | 75 | 4.7 | Sulfur | 2.0 | TBzTD | 1.0 | Cz | 1 |
| 7 | 27 | 73 | 3.0 | Sulfur | 2.0 | TBzTD | 1.0 | Cz | 1 |
| 8 | 27 | 73 | 3.0 | Sulfur | 2.0 | TBzTD | 1.0 | Cz | 1 |
| 9 | 27 | 73 | 3.0 | Sulfur | 2.0 | TBzTD | 1.0 | Cz | 1 |
| 10 | 27 | 73 | 3.0 | Sulfur | 2.0 | TBzTD | 1.0 | Cz | 1 |
| 11 | 27 | 73 | 3.0 | Sulfur | 2.0 | TBzTD | 1.0 | Cz | 1 |
| 12 | 27 | 73 | 3.0 | Sulfur | 2.0 | TBzTD | 1.0 | Cz | 1 |
| 13 | 35 | 65 | 0.4 | Sulfur | 2.0 | TBzTD | 1.0 | Cz | 1 |
| 14 | 25 | 75 | 4.7 | Sulfur | 2.0 | TBzTD | 1.0 | Cz | 1 |
| 15 | 27 | 73 | 3.2 | Sulfur | 2.0 | TBzTD | 1.0 | Cz | 1 |
| 16 | 26 | 74 | 3.2 | Sulfur | 2.0 | TBzTD | 1.0 | Cz | 1 |
| 17 | 26 | 74 | 3.2 | Sulfur | 2.0 | TBzTD | 1.0 | Cz | 1 |
| 18 | 25 | 75 | 5.7 | Sulfur | 2.0 | EP-60 | 4.5 | — | — |
| 19 | 27 | 73 | 1.0 | Sulfur | 2.0 | EP-60 | 4.5 | — | — |
| 20 | 27 | 73 | 0.5 | Sulfur | 2.0 | TBT | 1.0 | Cz | 1 |
| 21 | 35 | 65 | 0.6 | Sulfur | 2.0 | TBzTD | 1.0 | Cz | 1 |
| 22 | 27 | 73 | 1.0 | Sulfur | 2.0 | EP-60 | 4.5 | — | — |
| 23 | 28 | 72 | 0.5 | Sulfur | 2.0 | TBT | 1.0 | Cz | 1 |
| 24 | 27 | 73 | 3.0 | Sulfur | 2.0 | TBzTD | 1.0 | Cz | 1 |
| 25 | — | 100 | — | Sulfur | 1.8 | TBzTD | 1.0 | Cz | 1 |
| 26 | 50 | 50 | 3.0 | Sulfur | 2.0 | TBzTD | 1.0 | Cz | 1 |
| 27 | 28 | 72 | 1.5 | Sulfur | 1.8 | TS | 1.0 | MB | 1 |
| 28 | 30 | 70 | 3.0 | Sulfur | 2.0 | TBzTD | 1.0 | Cz | 1 |

TABLE 9

| Impregnation paint No. | Monomer: Monomer type | Monomer: Parts by mass | Photopolymerization initiator: Initiator type | Photopolymerization initiator: Parts by mass | MEK: Parts by mass |
|---|---|---|---|---|---|
| 1 | Acryl 1 | 4 | Radical | 0.35 | 100 |
| 2 | Acryl 2 | 4 | Radical | 0.35 | 100 |
| 3 | Acryl 3 | 4 | Radical | 0.35 | 100 |
| 4 | Vinyl ether | 4 | Cation | 0.25 | 100 |

TABLE 9-continued

| Impregnation paint No. | Monomer: Monomer type | Monomer: Parts by mass | Photopolymerization initiator: Initiator type | Photopolymerization initiator: Parts by mass | MEK: Parts by mass |
|---|---|---|---|---|---|
| 5 | Epoxide | 4 | Cation | 0.25 | 100 |
| 6 | Isocyanate | 5 | — | — | 100 |

TABLE 10

| | Conductive member No. | Conductive rubber composition No. | Polishing process | Impregnation treatment: Impreg-nation paint | Impregnation treatment: Impreg-nation time (second) | Impe-dance (Ω) | Matrix volume resistivity (Ω · cm) | Sc/S (area %) | Proportion of domains in which A/B satisfies requirement (number %) | Average value of A/B |
|---|---|---|---|---|---|---|---|---|---|---|
| Example 1 | 1 | 1 | Presence | 1 | 4 | $5.8 \times 10^5$ | $9.1 \times 10^{13}$ | 28.0 | 85 | 1.06 |
| Example 2 | 2 | 2 | Presence | 2 | 4 | $2.6 \times 10^5$ | $7.8 \times 10^{13}$ | 30.0 | 87 | 1.04 |
| Example 3 | 3 | 3 | Presence | 2 | 4 | $9.0 \times 10^4$ | $8.8 \times 10^{13}$ | 32.5 | 90 | 1.03 |
| Example 4 | 4 | 4 | Presence | 2 | 4 | $5.2 \times 10^6$ | $9.0 \times 10^{13}$ | 28.0 | 85 | 1.06 |
| Example 5 | 5 | 5 | Presence | 3 | 4 | $7.4 \times 10^5$ | $8.9 \times 10^{13}$ | 27.8 | 91 | 1.03 |
| Example 6 | 6 | 6 | Presence | 2 | 4 | $6.0 \times 10^5$ | $9.0 \times 10^{13}$ | 28.2 | 82 | 1.08 |
| Example 7 | 7 | 7 | Presence | 2 | 4 | $4.7 \times 10^5$ | $4.0 \times 10^8$ | 27.5 | 86 | 1.06 |
| Example 8 | 8 | 8 | Presence | 2 | 8 | $3.5 \times 10^6$ | $3.8 \times 10^8$ | 27.5 | 85 | 1.06 |
| Example 9 | 9 | 9 | Presence | 4 | 4 | $3.2 \times 10^5$ | $3.9 \times 10^8$ | 27.5 | 85 | 1.06 |
| Example 10 | 10 | 10 | Presence | 5 | 4 | $6.1 \times 10^5$ | $3.9 \times 10^8$ | 27.5 | 86 | 1.07 |
| Example 11 | 11 | 11 | Presence | 6 | 4 | $9.2 \times 10^7$ | $4.1 \times 10^8$ | 27.4 | 85 | 1.06 |
| Example 12 | 12 | 12 | Presence | 2 | 4 | $1.4 \times 10^5$ | $4.0 \times 10^8$ | 27.5 | 84 | 1.06 |
| Example 13 | 13 | 13 | Presence | 2 | 4 | $8.4 \times 10^7$ | $3.8 \times 10^8$ | 27.6 | 91 | 1.03 |
| Example 14 | 14 | 14 | Presence | 2 | 4 | $5.7 \times 10^6$ | $4.7 \times 10^8$ | 27.5 | 82 | 1.09 |
| Example 15 | 15 | 15 | Presence | 2 | 4 | $6.8 \times 10^7$ | $3.8 \times 10^8$ | 27.3 | 84 | 1.07 |
| Example 16 | 16 | 16 | Presence | 2 | 4 | $2.9 \times 10^6$ | $4.0 \times 10^8$ | 25.2 | 82 | 1.06 |
| Example 17 | 17 | 17 | Presence | 2 | 4 | $7.1 \times 10^6$ | $3.9 \times 10^8$ | 25.1 | 82 | 1.07 |
| Example 18 | 18 | 18 | Presence | 2 | 4 | $2.3 \times 10^7$ | $6.2 \times 10^{15}$ | 28.2 | 80 | 1.10 |
| Example 19 | 19 | 19 | Presence | 2 | 4 | $3.1 \times 10^6$ | $5.8 \times 10^{15}$ | 27.5 | 91 | 1.04 |
| Example 20 | 20 | 20 | Presence | 2 | 4 | $3.2 \times 10^5$ | $3.2 \times 10^{15}$ | 27.5 | 87 | 1.03 |
| Example 21 | 21 | 21 | Presence | 2 | 4 | $7.8 \times 10^6$ | $8.3 \times 10^{13}$ | 27.8 | 86 | 1.04 |
| Example 22 | 22 | 22 | Presence | 2 | 4 | $4.8 \times 10^7$ | $8.1 \times 10^{13}$ | 27.0 | 87 | 1.05 |
| Example 23 | 23 | 23 | Presence | 2 | 4 | $8.0 \times 10^4$ | $8.0 \times 10^{13}$ | 27.1 | 87 | 1.07 |
| Example 24 | 24 | 24 | Absence | 2 | 4 | $1.3 \times 10^3$ | $3.5 \times 10^8$ | 27.5 | 85 | 1.06 |
| Comparative Example 1 | 25 | 25 | Presence | 2 | 4 | $3.5 \times 10^6$ | — | — | — | — |
| Comparative Example 2 | 26 | 26 | Presence | 2 | 4 | $4.5 \times 10^5$ | $3.2 \times 10^8$ | 23.5 | — | — |
| Comparative Example 3 | 27 | 27 | Presence | — | — | $1.2 \times 10^6$ | $7.8 \times 10^7$ | 28.0 | 83 | 1.07 |
| Comparative Example 4 | 28 | 28 | Presence | — | — | $9.7 \times 10^5$ | $8.6 \times 10^{13}$ | 28.0 | 85 | 1.06 |

In the table. $S_c/S$ represents a ratio (area %) of the cross-sectional area of the conductive particle to the cross-sectional area of the domain.

TABLE 11

| | | Con-ductive member No. | Presence or absence of MD structure | Interpenetrating polymer network (IPN): Monomer type | Interpenetrating polymer network (IPN): First region | Interpenetrating polymer network (IPN): Second region | Volume resis-tivity R1 (Ω · cm) | Volume resis-tivity R2 (Ω · cm) | R1 > R2 | R1/R2 | Volume resis-tivity of domain (Ω · cm) | Initial fogging (number) | Fogging after endur-ance (%) |
|---|---|---|---|---|---|---|---|---|---|---|---|---|---|
| Example | 1 | 1 | Presence | Acryl 1 | Presence | Absence | $3.1 \times 10^9$ | $4.2 \times 10^8$ | Y | 7.4 | $7.8 \times 10^2$ | 187 | 123 |
| | 2 | 2 | Presence | Acryl 2 | Presence | Absence | $5.0 \times 10^9$ | $4.0 \times 10^8$ | Y | 12.5 | $5.1 \times 10^2$ | 141 | 120 |
| | 3 | 3 | Presence | Acryl 2 | Presence | Absence | $4.8 \times 10^9$ | $4.1 \times 10^8$ | Y | 11.7 | $6.2 \times 10^1$ | 124 | 112 |

TABLE 11-continued

| | | Conductive member No. | Presence or absence of MD structure | Interpenetrating polymer network (IPN) Monomer type | First region | Second region | Volume resistivity R1 (Ω · cm) | Volume resistivity R2 (Ω · cm) | R1 > R2 | R1/R2 | Volume resistivity of domain (Ω · cm) | Initial fogging (number) | Fogging after endurance (%) |
|---|---|---|---|---|---|---|---|---|---|---|---|---|---|
| | 4 | 4 | Presence | Acryl 2 | Presence | Absence | $8.0 \times 10^{9}$ | $4.0 \times 10^{8}$ | Y | 20.0 | $8.1 \times 10^{2}$ | 217 | 109 |
| | 5 | 5 | Presence | Acryl 3 | Presence | Absence | $6.1 \times 10^{9}$ | $3.9 \times 10^{8}$ | Y | 15.6 | $4.6 \times 10^{3}$ | 129 | 108 |
| | 6 | 6 | Presence | Acryl 2 | Presence | Absence | $5.0 \times 10^{9}$ | $4.9 \times 10^{8}$ | Y | 10.2 | $9.8 \times 10^{3}$ | 221 | 128 |
| | 7 | 7 | Presence | Acryl 2 | Presence | Absence | $3.2 \times 10^{14}$ | $4.9 \times 10^{13}$ | Y | 4.1 | $4.4 \times 10^{3}$ | 187 | 112 |
| | 8 | 8 | Presence | Acryl 2 | Presence | Presence | $4.5 \times 10^{14}$ | $1.0 \times 10^{14}$ | Y | 4.5 | $4.1 \times 10^{3}$ | 231 | 127 |
| | 9 | 9 | Presence | Vinyl ether | Presence | Absence | $2.2 \times 10^{14}$ | $7.6 \times 10^{13}$ | Y | 2.9 | $4.6 \times 10^{3}$ | 234 | 129 |
| | 10 | 10 | Presence | Epoxide | Presence | Absence | $3.2 \times 10^{14}$ | $7.9 \times 10^{13}$ | Y | 4.1 | $4.3 \times 10^{3}$ | 227 | 123 |
| | 11 | 11 | Presence | Isocyanate | Presence | Absence | $3.4 \times 10^{14}$ | $7.8 \times 10^{13}$ | Y | 4.4 | $4.2 \times 10^{3}$ | 218 | 129 |
| | 12 | 12 | Presence | Acryl 2 | Presence | Absence | $3.5 \times 10^{14}$ | $7.7 \times 10^{13}$ | Y | 4.5 | $4.5 \times 10^{3}$ | 191 | 110 |
| | 13 | 13 | Presence | Acryl 2 | Presence | Absence | $3.4 \times 10^{14}$ | $7.8 \times 10^{13}$ | Y | 4.4 | $4.1 \times 10^{3}$ | 128 | 117 |
| | 14 | 14 | Presence | Acryl 2 | Presence | Absence | $3.3 \times 10^{14}$ | $7.7 \times 10^{13}$ | Y | 4.3 | $4.4 \times 10^{3}$ | 245 | 127 |
| | 15 | 15 | Presence | Acryl 2 | Presence | Absence | $4.1 \times 10^{14}$ | $8.3 \times 10^{13}$ | Y | 4.9 | $6.5 \times 10^{2}$ | 204 | 114 |
| | 16 | 16 | Presence | Acryl 2 | Presence | Absence | $4.5 \times 10^{14}$ | $8.2 \times 10^{13}$ | Y | 5.5 | $5.1 \times 10^{1}$ | 228 | 126 |
| | 17 | 17 | Presence | Acryl 2 | Presence | Absence | $4.4 \times 10^{14}$ | $8.3 \times 10^{13}$ | Y | 5.3 | $8.8 \times 10^{3}$ | 233 | 127 |
| | 18 | 18 | Presence | Acryl 2 | Presence | Absence | $5.1 \times 10^{9}$ | $4.7 \times 10^{8}$ | Y | 10.9 | $9.8 \times 10^{3}$ | 248 | 130 |
| | 19 | 19 | Presence | Acryl 2 | Presence | Absence | $3.3 \times 10^{14}$ | $7.9 \times 10^{13}$ | Y | 4.2 | $4.4 \times 10^{3}$ | 187 | 111 |
| | 20 | 20 | Presence | Acryl 2 | Presence | Absence | $3.2 \times 10^{14}$ | $7.8 \times 10^{13}$ | Y | 4.1 | $4.1 \times 10^{3}$ | 105 | 113 |
| | 21 | 21 | Presence | Acryl 2 | Presence | Absence | $4.8 \times 10^{9}$ | $3.9 \times 10^{8}$ | Y | 12.3 | $4.6 \times 10^{3}$ | 123 | 114 |
| | 22 | 22 | Presence | Acryl 2 | Presence | Absence | $3.5 \times 10^{16}$ | $6.0 \times 10^{15}$ | Y | 5.8 | $6.5 \times 10^{3}$ | 147 | 108 |
| | 23 | 23 | Presence | Acryl 2 | Presence | Absence | $1.6 \times 10^{16}$ | $3.1 \times 10^{15}$ | Y | 5.2 | $9.1 \times 10^{3}$ | 134 | 113 |
| | 24 | 24 | Presence | Acryl 2 | Presence | Absence | $3.2 \times 10^{14}$ | $7.8 \times 10^{13}$ | Y | 4.1 | $4.4 \times 10^{3}$ | 237 | 124 |
| Comparative Example | 1 | 25 | Absence | Acryl 2 | Absence | Absence | — | — | — | — | — | 312 | 136 |
| | 2 | 26 | Absence | Acryl 2 | Absence | Absence | — | — | — | — | $6.2 \times 10^{4}$ | 274 | 134 |
| | 3 | 27 | Presence | — | — | — | $3.9 \times 10^{8}$ | $4.1 \times 10^{8}$ | N | 1.0 | $7.8 \times 10^{2}$ | 281 | 146 |
| | 4 | 28 | Presence | — | — | — | $3.8 \times 10^{8}$ | $3.8 \times 10^{8}$ | N | 1.0 | $8.0 \times 10^{2}$ | 253 | 133 |

In the table, the presence or absence of the MD structure indicates the presence or absence of the matrix-domain structure, Y indicates that R1>R2 is satisfied, and N indicates that R1>R2 is not satisfied.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-166533, filed Sep. 27, 2023, and Japanese Patent Application No. 2024-153704, filed Sep. 6, 2024 which are hereby incorporated by reference herein in their entirety.

What is claimed is:

1. An electrophotographic conductive member comprising:

a support having a conductive outer surface; and a conductive layer provided on the outer surface of the support, wherein the conductive layer comprises a matrix comprising a crosslinked product of a first rubber and a plurality of domains dispersed in the matrix, the plurality of domains comprise a crosslinked product of a second rubber and a conductive particle, at least parts of the plurality of domains are exposed on an outer surface of the electrophotographic conductive member, the outer surface of the electrophotographic conductive member is configured of the matrix and an exposed portion of the domain exposed on the outer surface of the electrophotographic conductive member, an impedance is $1.0\times10^3$ to $1.0\times10^8\Omega$ when an electrode is directly provided on the outer surface of the electrophotographic conductive member and an alternating current voltage having an amplitude of 1 V and a frequency of 1.0 Hz is applied between the outer surface of the support and the electrode under an environment of a temperature of 23° C. and a relative humidity of 50%, and when the domain exposed on the outer surface of the electrophotographic conductive member is a domain A, and in a cross section of the domain A in a thickness direction of the conductive layer, a maximum length of the domain A in the thickness direction of the conductive layer is Ld, a region having a thickness of 0.1×Ld on a side farthest from the support in the cross section of the domain A is a first region, and a region having a thickness of 0.1×Ld on a side closest to the support in the cross section of the domain A is a second region, a volume resistivity R1 of a portion being not the conductive particle in the first region and a volume resistivity R2 of a portion being not the conductive particle in the second region satisfy R1>R2.

2. The electrophotographic conductive member according to claim 1, wherein the volume resistivity R1 and the volume resistivity R2 satisfy R1/R2≥3.0.

3. The electrophotographic conductive member according to claim 1, wherein the domain exposed on the outer surface of the electrophotographic conductive member further comprises at least one resin selected from the group consisting of a (meth)acrylic resin, an epoxy resin, a vinyl ether resin, and a urea resin, and the resin forms an interpenetrating polymer network together with the first rubber and the second rubber.

4. The electrophotographic conductive member according to claim 1, wherein the first region further comprises a (meth)acrylic resin, the (meth)acrylic resin forms an interpenetrating polymer network together with the first rubber and the second rubber, and the second region does not comprise a (meth)acrylic resin.

5. The electrophotographic conductive member according to claim 1, wherein, in domains observed in each of all nine observation regions when 15 μm square observation regions are placed at three locations of a thickness region from an outer surface of the conductive layer to a depth of 0.1 T to 0.9 T for each of cross sections of the conductive layer in the thickness direction at a total of three locations including a center of the conductive layer in a longitudinal direction and two locations of L/4 from both ends of the conductive layer toward the center, where L is a length of the conductive layer in the longitudinal direction and T is a thickness of the conductive layer, a proportion of number of domains in which a value of A/B is 1.00 to 1.10 is 80 number % or more, where A is a perimeter of the domain and B is an envelope perimeter of the domain.

6. The electrophotographic conductive member according to claim 1, wherein in a domain observed in the cross section of the conductive layer in the thickness direction, a ratio $S_c/S$ of a cross-sectional area of the conductive particle to a cross-sectional area of the domain is 20.0 to 35.0 area %.

7. The electrophotographic conductive member according to claim 1, wherein a volume resistivity ρm of the matrix is $1.0\times10^8$ to $1.0\times10^{17}$ Ω·cm.

8. The electrophotographic conductive member according to claim 1, wherein the first rubber comprises at least one selected from the group consisting of isoprene rubber, butadiene rubber, styrene-butadiene rubber, acrylonitrile butadiene rubber, and ethylene propylene diene rubber, and the second rubber comprises at least one selected from the group consisting of isoprene rubber, butadiene rubber, styrene-butadiene rubber, acrylonitrile butadiene rubber, and ethylene propylene diene rubber.

9. The electrophotographic conductive member according to claim 1, wherein an absolute value of a difference in solubility parameter between the first rubber and the second rubber is 0.4 to 5.0 $(J/cm^3)^{0.5}$.

10. The electrophotographic conductive member according to claim 9, wherein a combination of the first rubber and the second rubber is styrene-butadiene rubber and acrylonitrile butadiene rubber, acrylonitrile butadiene rubber and styrene-butadiene rubber, acrylonitrile butadiene rubber and butadiene rubber, ethylene propylene diene rubber and acrylonitrile butadiene rubber, ethylene propylene diene rubber and styrene-butadiene rubber, isoprene rubber and styrene-butadiene rubber, butadiene rubber and acrylonitrile butadiene rubber, styrene-butadiene rubber and ethylene propylene diene rubber, or styrene-butadiene rubber and isoprene rubber.

11. A process cartridge configured to be detachably attached to a main body of an electrophotographic image forming apparatus, the process cartridge comprising the electrophotographic conductive member according to claim 1.

12. An electrophotographic image forming apparatus comprising an electrophotographic conductive member, wherein the electrophotographic conductive member comprises a support having a conductive outer surface; and a conductive layer provided on the outer surface of the support, the conductive layer comprises a matrix comprising a crosslinked product of a first rubber and a plurality of domains dispersed in the matrix, the plurality of domains comprise a crosslinked product of a second rubber and a conductive particle, at least parts of the plurality of domains are exposed on an outer surface of the electrophotographic conductive member, the outer surface of the electrophotographic conductive member is configured of the matrix and an exposed portion of the domain exposed on the outer surface of the electrophotographic conductive member, an impedance is $1.0\times10^3$ to $1.0\times10^8\Omega$ when an electrode is directly provided on the outer surface of the electrophotographic conductive member and an alternating current voltage having an amplitude of 1 V and a frequency of 1.0 Hz is applied between the outer surface of the support and the electrode under an environment of a temperature of 23° C. and a relative humidity of 50%, and when the domain exposed on the outer surface of the electrophotographic conductive member is a domain A, and in a cross section of the domain A in a thickness direction of the conductive layer, a maximum length of the domain A in the thickness direction of the conductive layer is Ld, a region having a thickness of 0.1×Ld on a side farthest from the support in the cross section of the domain A is a first region, and a region having a thickness of 0.1×Ld on a side closest to the support in the cross section of the domain A is a second region, a volume resistivity R1 of a portion being not the conductive particle in the first region and a volume resistivity R2 of a portion being not the conductive particle in the second region satisfy R1>R2.

13. The electrophotographic image forming apparatus according to claim 12, wherein the electrophotographic image forming apparatus comprises an electrophotographic photosensitive member and a charging member charging the electrophotographic photosensitive member, and the charging member is the electrophotographic conductive member.

14. The electrophotographic image forming apparatus according to claim 13, wherein a charging bias applied between the electrophotographic photosensitive member and the charging member is −700 to −900 V.

* * * * *